(12) United States Patent
Yang

(10) Patent No.: US 12,513,154 B2
(45) Date of Patent: Dec. 30, 2025

(54) BLOCKCHAIN-BASED DATA DETECTION METHOD, APPARATUS, AND COMPUTER-READABLE STORAGE MEDIUM

(71) Applicant: Tencent Technology (Shenzhen) Company Limited, Shenzhen (CN)

(72) Inventor: Changqing Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 442 days.

(21) Appl. No.: 17/742,227

(22) Filed: May 11, 2022

(65) Prior Publication Data

US 2022/0272105 A1     Aug. 25, 2022

Related U.S. Application Data

(63) Continuation of application No. PCT/CN2021/088624, filed on Apr. 21, 2021.

(30) Foreign Application Priority Data

May 21, 2020    (CN) .......................... 202010433284.9

(51) Int. Cl.
    *H04L 67/1097*     (2022.01)
    *G06F 21/55*       (2013.01)
    *H04L 9/40*       (2022.01)

(52) U.S. Cl.
    CPC ............ *H04L 63/12* (2013.01); *G06F 21/554* (2013.01)

(58) Field of Classification Search
    CPC .......... H04L 63/12; H04L 9/50; G06F 21/554
    See application file for complete search history.

(56) References Cited

U.S. PATENT DOCUMENTS 10,722,649 B2 *   7/2020   Tang ................... G06F 16/2379
11,265,173 B2 *   3/2022   Liao ........................ G06F 21/64
(Continued)

FOREIGN PATENT DOCUMENTS

CN     107508680 A     12/2017
CN     107579848 A      1/2018
(Continued)

OTHER PUBLICATIONS

Tencent Technology, WO, PCT/CN2021/088624, Jul. 21, 2021, 5 pgs.

(Continued)

*Primary Examiner* — Alexander Lagor
*Assistant Examiner* — Rupali Dhakad
(74) *Attorney, Agent, or Firm* — Morgan, Lewis & Bockius LLP

(57) ABSTRACT

This application discloses a blockchain-based data detection method performed by a computer device. The method includes obtaining respective block verification results of at least two consensus nodes for a to-be-verified block; counting valid verification results and invalid verification results among the respective block verification results of the at least two consensus nodes; determining a target verification result for the block according to the counts, comparing the target verification result with the respective block verification results of the at least two consensus nodes for the block, and updating a historical quantity of abnormal verifications corresponding to each consensus node according to a result of the comparison, to obtain a target quantity of abnormal verifications of each consensus node counted by the target consensus node; and determining an abnormal consensus node among the at least two consensus nodes according to the target quantity of abnormal verifications counted by the target consensus node.

19 Claims, 8 Drawing Sheets

(56) References Cited

U.S. PATENT DOCUMENTS

| | | | | |
|---|---|---|---|---|
| 2017/0236120 | A1* | 8/2017 | Herlihy | G06Q 20/065 |
| | | | | 705/67 |
| 2018/0101560 | A1* | 4/2018 | Christidis | H04L 9/3236 |
| 2019/0036710 | A1* | 1/2019 | Qiu | H04L 9/3265 |
| 2019/0333030 | A1 | 10/2019 | Ramasamy et al. | |
| 2020/0110648 | A1* | 4/2020 | Yang | G06F 11/182 |
| 2020/0112572 | A1* | 4/2020 | Ajayi | H04L 63/20 |
| 2020/0120157 | A1* | 4/2020 | Xie | H04L 9/0643 |
| 2021/0119778 | A1* | 4/2021 | Cheng | H04L 9/3247 |
| 2021/0132928 | A1* | 5/2021 | Xiao | H04L 9/3239 |

FOREIGN PATENT DOCUMENTS

| | | | | |
|---|---|---|---|---|
| CN | 109034851 A | | 12/2018 | |
| CN | 109086619 A | | 12/2018 | |
| CN | 109146499 A | * | 1/2019 | |
| CN | 110232634 A | | 9/2019 | |
| CN | 110247774 A | | 9/2019 | |
| CN | 110445619 A | | 11/2019 | |
| CN | 110555773 A | * | 12/2019 | G06F 16/24552 |
| CN | 110932892 A | | 3/2020 | |
| CN | 111343208 A | | 6/2020 | |
| CN | 111444211 B | * | 7/2021 | G06F 16/2365 |
| JP | 2020512708 A | | 4/2020 | |

OTHER PUBLICATIONS

Tencent Technology, IPRP, PCT/CN2021/088624, Nov. 17, 2022, 6 pgs.
Tencent Technology, ISR, PCT/CN2021/088624, Jul. 21, 2021, 3 pgs.
Tencent Technology, Japanese Office Action, JP Patent Application No. 2022-539369, Jul. 4, 2023, 5 pgs.

\* cited by examiner

BLOCKCHAIN-BASED DATA DETECTION METHOD, APPARATUS, AND COMPUTER-READABLE STORAGE MEDIUM

CROSS-REFERENCE TO RELATED APPLICATIONS

This application is a continuation application of PCT Patent Application No. PCT/CN2021/088624, entitled "BLOCKCHAIN-BASED DATA DETECTION METHOD AND DEVICE, AND COMPUTER-READABLE STORAGE MEDIUM" filed on Apr. 21, 2021, which claims priority to Chinese Patent Application No. 202010433284.9, filed with the State Intellectual Property Office of the People's Republic of China on May 21, 2020, and entitled "DATA DETECTION METHOD AND DEVICE BASED ON BLOCK CHAIN AND COMPUTER READABLE STORAGE MEDIUM", all of which are incorporated herein by reference in their entirety.

FIELD OF THE TECHNOLOGY

This application relates to the field of blockchain technologies, and in particular, to a blockchain-based data detection method, apparatus, computer device, and computer-readable storage medium.

BACKGROUND OF THE DISCLOSURE

With the continuous development of computer networks, blockchain-related technologies are becoming more and more mature. In blockchain-related application scenarios, when a block is to be uploaded to a blockchain, the block needs to be verified by consensus nodes. The block can be uploaded to the blockchain only when the block passes the verification by most of the consensus nodes.

In the related art, there are usually multiple consensus nodes in a blockchain network, and there may be a malicious consensus node among the multiple consensus nodes. The malicious consensus node may generate an abnormal block containing fake transaction data, and request to upload the abnormal block to and, to the blockchain. The malicious consensus node may continuously submit different abnormal blocks to request to upload the abnormal blocks to the blockchain. Generally, abnormal blocks cannot pass the verification by the consensus mechanism of the blockchain network. However, if the malicious consensus node continuously tries to submit abnormal blocks to request to upload the abnormal blocks to the blockchain, it is possible that an abnormal block passes the verification, resulting in low network security of the blockchain network.

SUMMARY

Embodiments of this application provide a blockchain-based data detection method, apparatus, and computer-readable storage medium, which can improve the network security of blockchain networks.

An embodiment of this application provides a blockchain-based data detection method performed by a computer device acting as a target consensus node of a blockchain and the method including:

obtaining respective block verification results of at least two consensus nodes of the blockchain for a to-be-verified block;

counting a first quantity of valid verification results and a second quantity of invalid verification results among the respective block verification results of the at least two consensus nodes for the block;

determining a target verification result for the block according to the first quantity and the second quantity, the target verification result being a valid verification result or an invalid verification result;

comparing the target verification result with the respective block verification results of the at least two consensus nodes for the block, and updating a historical quantity of abnormal verifications corresponding to each consensus node according to a result of the comparison, to obtain a target quantity of abnormal verifications of each consensus node counted by the target consensus node; and determining an abnormal consensus node among the at least two consensus nodes according to the target quantity of abnormal verifications of each consensus node counted by the target consensus node.

An embodiment of this application further provides a computer device, including a memory and a processor, the memory storing a computer program, the computer program, when executed by a processor, implementing the blockchain-based data detection method provided in the embodiments of this application.

An embodiment of this application further provides a non-transitory computer-readable storage medium, storing a computer program, the computer program including program instructions, the program instructions, when executed by a processor, implementing the blockchain-based data detection method provided in the embodiments of this application.

The technical solution of the embodiments of this application includes: obtaining respective block verification results of at least two consensus nodes for a to-be-verified block; counting a first quantity of valid verification results and a second quantity of invalid verification results among the respective block verification results of the at least two consensus nodes for the block; determining a target verification result for the block according to the first quantity and the second quantity, the target verification result being a valid verification result or an invalid verification result; comparing the target verification result with the respective block verification results of the at least two consensus nodes for the block, and updating a historical quantity of abnormal verifications corresponding to each consensus node according to a result of the comparison, to obtain a target quantity of abnormal verifications of each consensus node counted by the target consensus node; and determining an abnormal consensus node among the at least two consensus nodes according to the target quantity of abnormal verifications of each consensus node counted by the target consensus node. As such, an abnormal consensus node can be detected from at least two consensus nodes. By actively discovering an abnormal consensus node in a blockchain network and performing corresponding processing on the abnormal consensus node (for example, adding the abnormal consensus to a blacklist), the network security of the blockchain network is improved.

DESCRIPTION OF EMBODIMENTS

The technical solutions of this application are clearly and completely described below with reference to the accompanying drawings of this application. Apparently, the described embodiments are merely some rather than all of the embodiments of this application. All other embodiments obtained by a person of ordinary skill in the art based on the embodiments of this application without creative efforts shall fall within the protection scope of this application.

In the following descriptions, the term "some embodiments" describes subsets of all possible embodiments, but it may be understood that "some embodiments" may be the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

A blockchain is a new application mode of computer technologies such as distributed data storage, point-to-point transmission, a consensus mechanism, and an encryption algorithm. The blockchain is essentially a decentralized database and a series of associated data blocks generated in a cryptographic manner. Each data block includes information about a batch of network transactions for verifying the validity of the information (for anti-counterfeiting) and generating a next block. The blockchain may include an underlying blockchain platform, a platform product service layer, and application service layer. A blockchain network may include multiple (i.e., at least two) consensus nodes, and the multiple consensus nodes are configured to perform consensus verification on a block generated in the blockchain network, to decide whether the generated block can be uploaded on the blockchain. In practical application scenarios, there may be an abnormal consensus node among the multiple consensus nodes in the blockchain network. The abnormal consensus node may threaten the network security of the blockchain network. Therefore, how to detect an abnormal consensus node among multiple consensus nodes of a blockchain network is mainly described below in the embodiments of this application.

Figure 1:
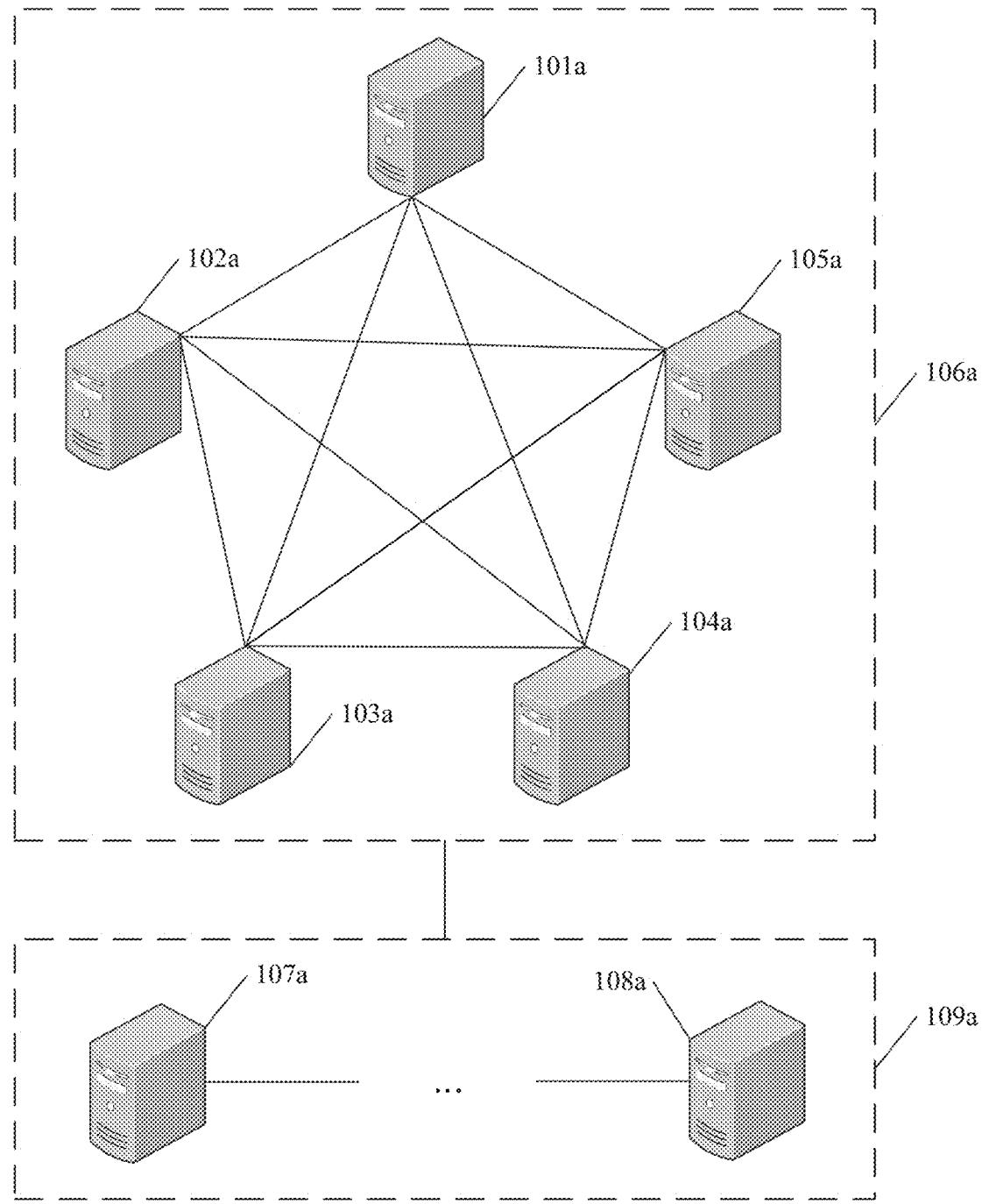
FIG. 1 is a schematic diagram of a network architecture according to an embodiment of this application.

FIG. 1 is a schematic diagram of a network architecture according to an embodiment of this application. As shown in FIG. 1, the schematic diagram of the network architecture may represent a blockchain network. The blockchain network may include multiple consensus nodes and multiple service nodes. The multiple consensus nodes and the multiple service nodes are all blockchain nodes in the blockchain network. The multiple consensus nodes may be a consensus node 101a, a consensus node 102a, a consensus node 103a, a consensus node 104a, and a consensus node 105a in a node set 106a. The multiple service nodes may include a service node 107a, a service node 108a, etc. in a node set 109a. The term "multiple" or "plurality of" in the embodiments of this application may refer to two or more than two.

In fact, the consensus nodes in the blockchain network are also service nodes in the blockchain network. It may be understood that the consensus nodes are blockchain nodes capable of packaging blocks and performing consensus verification on the blocks, which are selected from all service nodes in the blockchain network. In the schematic diagram of the network architecture in FIG. 1, the blockchain nodes in the node set 106a (including the consensus node 101a, the consensus node 102a, the consensus node 103a, the consensus node 104a, and the consensus node 105a) are consensus nodes in the blockchain network, and the blockchain nodes in the node set 109a (including the service node 107a, the service node 108a, etc.) are blockchain nodes in the blockchain network other than the consensus nodes. A consensus node in the blockchain network may package transaction data generated by a service node (including all the blockchain nodes in the schematic diagram of the network architecture in FIG. 1) into a block, transmit the block to other consensus nodes for consensus verification, and upload the block to the blockchain if the verification is passed, or not upload the block to the blockchain if the verification fails.

In some embodiments, a blockchain node in the schematic diagram of the network architecture in FIG. 1 may be one server, multiple servers, a terminal device, etc. The server that constitutes the blockchain node may be an independent physical server, a server cluster or a distributed system including multiple physical servers, or a cloud server that provides cloud computing services. The terminal device may be a smartphone, a tablet computer, a notebook computer, a desktop computer, a smart speaker, a smartwatch, or the like, but is not limited thereto. The terminal device and the server may be directly or indirectly connected through wired or wireless communication, which is not limited in this application.

The embodiments of this application also relate to cloud security-related technologies. Cloud security is a collective term for security software, hardware, users, institutions, and security cloud platforms based on cloud computing business model applications. Cloud security integrates emerging technologies and concepts such as parallel processing, grid computing, and unknown virus behavior judgment, to obtain the latest information on Trojans and malicious programs in the Internet by monitoring abnormal software behavior in the network by a large quantity of mesh clients, transmit the latest information to a server side for automatic analysis and processing, and distribute solutions to viruses and Trojans to each client.

The main research directions of cloud security include: 1. cloud computing security, which mainly studies how to ensure the security of the cloud itself and various applications on the cloud, including cloud computer system security, secure storage and isolation of user data, user access authentication, information transmission security, network attack protection, compliance audit, etc.; 2. cloud-based security infrastructure, which mainly studies how to use cloud computing to build and integrate security infrastructure resources and optimize security protection mechanisms, including the construction of ultra-large-scale security event/information collection and processing platforms through cloud computing technology, to realize the collection and correlation analysis of massive information, thereby improving the network-wide security event control and risk control capabilities; and 3. cloud security services, which mainly studies various security services provided to users based on cloud computing platforms, such as anti-virus services.

This application mainly relates to a cloud security service in the field of cloud security technologies. The cloud security service in this application is mainly embodied in detecting an abnormal consensus node among multiple consensus nodes in a blockchain network, and blacklist the detected abnormal consensus node, thereby providing users with a more secure cloud service. The cloud service may perform consensus verification on transaction data submitted by a user and upload the transaction data to the blockchain, and so on.

This application focuses on how to find an abnormal consensus node (or referred to as a malicious consensus node) among multiple consensus nodes in a blockchain network according to verification results of the consensus nodes for a block. Refer to the process described in the following embodiment corresponding to FIG. 2.

Figure 2:
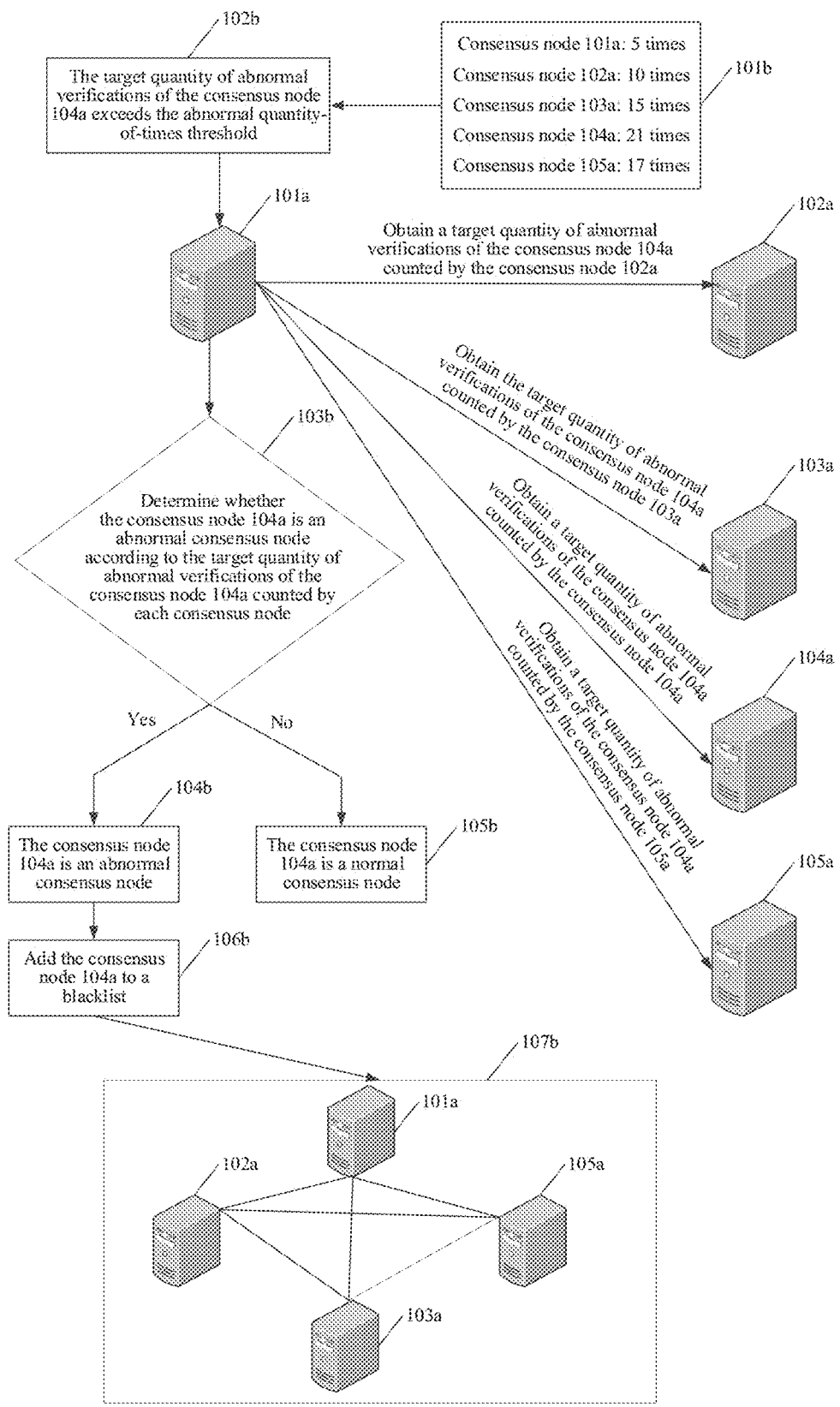
FIG. 2 is a schematic diagram of a data detection scenario according to an embodiment of this application.

FIG. 2 is a schematic diagram of a data detection scenario according to this application. As shown in FIG. 2, the detection of an abnormal consensus node among the consensus node 101a, the consensus node 102a, the consensus node 103a, the consensus node 104a, and the consensus node 105a in FIG. 1 is taken as an example for description. First, the consensus node 101a, the consensus node 102a, the consensus node 103a, the consensus node 104a, and the consensus node 105a may vote for each other to elect a leader consensus node (or referred to as a target consensus node). The leader consensus node is configured to find a suspicious consensus node among all the consensus nodes, instruct all the consensus nodes to initiate an arbitration on the suspicious consensus node, and determine whether to kick the suspicious consensus node out of the blockchain network according to a result of the arbitration. Here, it is assumed that the consensus node 101a is elected as the leader consensus node.

In some embodiments, each time consensus verification is performed on a block, each consensus node counts respective quantities of abnormal verifications of the consensus nodes according to respective verification results of the consensus nodes for the block. The respective quantities of abnormal verifications of the consensus nodes that are counted by each consensus node is referred to as target quantities of abnormal verifications. After consensus verification is performed on a block, the target quantity of abnormal verifications of each consensus node corresponding to the block is counted. The target quantity of abnormal verifications of each consensus node corresponding to a current block is obtained by updating the target quantity of abnormal verifications of each consensus node corresponding to a block previous to the current block. The target quantity of abnormal verifications of each consensus node corresponding to the block previous to the current block may be referred to as a historical quantity of abnormal verifications of each consensus node corresponding to the current block. Here, an example where the consensus node 101a counts the target quantity of abnormal verifications of each consensus node after consensus verification on a block s is described. It may be understood that the processes of counting the target quantity of abnormal verifications of each consensus node by other consensus nodes are the same as the process of counting the target quantity of abnormal verifications of each consensus node by the consensus node 101a, and the principle of updating the quantity of abnormal verifications of each consensus node according to the consensus result of each block is the same as the principle of updating the quantity of abnormal verifications of each consensus node according to the consensus result of the block s. To be specific, when consensus verification is performed on the block s, each consensus node performs verification on the block s, and obtains a verification result for the block s. The verification result may include a valid verification result and an invalid verification result. The valid verification result is used for indicating that the validity verification of the block s is passed. The invalid verification result is used for indicating that the validity verification of the block s is not passed. In actual implementations, one block may contain multiple transaction data. When the verification result of a consensus node for the block s is a valid verification result, it indicates that the consensus node has verified that the transaction data contained in the block s is authentic and credible. When the verification result of a consensus node for the block s is an invalid verification result, it indicates that the consensus node has verified that the block s contains unauthentic transaction data, that is, has verified that the transaction data contained in the block s is not authentic and credible. The consensus node 101a may obtain the verification results of other consensus nodes for the block s. The consensus node 101a may count a quantity of valid verification results and a quantity of invalid verification results among the obtained consensus results of all the consensus nodes for the block s. When the quantity of valid verification results is greater than the quantity of invalid verification results, the valid verification result may be used as a target verification result for the block s. When the quantity of valid verification results is less than the quantity of invalid verification results, the invalid verification result may be used as the target verification result for the block s. The target verification result is a final verification result obtained from the verification on the block s by all the consensus nodes in the blockchain network.

For example, the consensus node 101a may obtain a verification result of the consensus node 102a for the block s, a verification result of the consensus node 103a for the block s, a verification result of the consensus node 104a for the block s, and a verification result of the consensus node 105a for the block s. Assume that the verification result of the consensus node 101a for the block s is the invalid verification result, the verification result of the consensus node 102a for the block s obtained by the consensus node 101a is the invalid verification result, the verification result of the consensus node 103a for the block s obtained by the consensus node 101a is the invalid verification result, the verification result of the consensus node 104a for the block s obtained by the consensus node 101a is the valid verification result, and the verification result of the consensus node 105a for the block s obtained by the consensus node 101a is the valid verification result. In this case, among all the consensus results obtained by the consensus node 101a, the quantity of invalid verification results is 3, and the quantity of valid verification results is 2. Since the quantity of invalid verification results being 3 is greater than the quantity of valid verification results being 2, the consensus node 101a may use the invalid verification result as the target verification result of the block s.

An initial quantity of abnormal verifications of each consensus node recorded by the consensus node 101a may be referred to as a default initial quantity. The default initial quantity may be set by the consensus node 101a, for example, set to 0. The consensus node 101a may compare the verification result of each consensus node for the block s with the target verification result. When determining that the verification result of a consensus node (e.g., consensus node 102a) for the block s is different from the target verification result of the block s, the consensus node 101a may increase the initial quantity of abnormal verifications of the consensus node 102a by 1 to obtain the target quantity of abnormal verifications of the consensus node 102a. When determining that the verification result of a consensus node (e.g., consensus node 103a) for the block s is the same as the target verification result of the block s, the consensus node 101a may keep the initial quantity of abnormal verifications of the consensus node 103a unchanged, that is, use the initial quantity of abnormal verifications of the consensus node 103a as the target quantity of abnormal verifications of the consensus node 103a. It may be understood that w % ben the consensus node 101a updates the quantity of abnormal verifications of each consensus node using a verification result of each consensus node for a block next to the block s, the quantity of abnormal verifications of each consensus node that has been updated using the verification result of the block s may be used as an initial quantity of abnormal verifications of each consensus node at this moment. In other words, the quantity of abnormal verifications of each consensus node that has been updated using the verification result of the current block is the initial quantity of abnormal verifications of each consensus node when the quantity of abnormal verifications of each consensus node is updated using the verification result of the next block.

In some embodiments, the block previous to the block s may be referred to as a predecessor block of the block s. If the block s is the first block undergoing consensus verification in the blockchain network during the period where the consensus node 101a acts as the leader consensus node, the block s has no predecessor block. If the block s is not the first block undergoing consensus verification in the blockchain network during the period where the consensus node 101a acts as the leader consensus node, the block s has a predecessor block. If the block s has no predecessor block, the historical quantity of abnormal verifications of each consensus node is the set default initial quantity (for example, 0) of each consensus node set. When the block s has a predecessor block, the historical quantity of abnormal verifications of each consensus node is the target quantity of abnormal verifications of each consensus node obtained according to a verification result of each consensus node for the block previous to the block s, that is, the historical quantity of abnormal verifications of each consensus node corresponding to the block s is the target quantity of abnormal verifications of each consensus node corresponding to the predecessor block of the block s. The process of obtaining the target quantity of abnormal verifications of each consensus node corresponding to the predecessor block of the block s according to the verification result of each consensus node for the predecessor block is the same as the process of obtaining the target quantity of abnormal verifications of each consensus node corresponding to the block s according to the verification result of each consensus node for the block s.

In some embodiments, a unit time may be set, which may be, for example, 1 hour, 1 day, or 1 week. In this unit time, multiple blocks that require consensus verification may be generated. The process of obtaining the target quantity of abnormal verifications of each consensus node through updating according to the verification result of each block by the consensus node 101a is the same as the above process by obtaining the target quantity of abnormal verifications of each consensus node through updating according to the verification results of the block s by the consensus node 101a. Then, after the unit time, the consensus node 101a can obtain a final result after updating the quantity of abnormal verifications of each consensus node according to the verification results of all blocks in the unit time, that is, can obtain the quantity of target abnormal verifications of each consensus node corresponding to the last block undergoing consensus verification in the unit time.

For example, the final result obtained by the consensus node 101a may be a result 101b. The result 101b includes: the target quantity of abnormal verifications for the consensus node 101a finally recorded by the consensus node 101a is 5, the target quantity of abnormal verifications for the consensus node 102a finally recorded by the consensus node 101a is 10, the target quantity of abnormal verifications for the consensus node 103a finally recorded by the consensus node 101a is 15, the target quantity of abnormal verifications for the consensus node 104a finally recorded by the consensus node 101a is 21, and the target quantity of abnormal verifications for the consensus node 105a finally recorded by the consensus node 101a is 17.

An abnormal quantity-of-times threshold may be set. For example, the abnormal quantity-of-times threshold may be set to 20. The abnormal quantity-of-times threshold indicates a maximum value of the target quantity of abnormal verifications of a consensus node in a unit time within a normal range. Assuming that the abnormal quantity-of-times threshold is 20, in step 102b, the consensus node 101a detects that the target quantity of abnormal verifications of the consensus node 104a being 21 is greater than the abnormal quantity-of-times threshold being 20. The consensus node 102a, the consensus node 103a, the consensus node 104a, and the consensus node 105a may perform the same process as that of the consensus node 101a to record the target quantity of abnormal verifications of each consensus node in a unit time. In other words, each consensus node records the target quantities of abnormal verifications of the consensus nodes counted by itself, and each consensus node records a result similar to the result 101b. When the consensus node 101a detects that the target quantity of abnormal verifications of the consensus node 104a is greater than the abnormal quantity-of-times threshold, the consensus node 101a may obtain, from other consensus nodes, the target quantities of abnormal verifications of the consensus node 104a counted by the other consensus nodes at this time.

For example, the consensus node 101a may obtain the target quantity of abnormal verifications for the consensus node 104a recorded by the consensus node 102a, the consensus node 101a may obtain the target quantity of abnormal verifications for the consensus node 104a recorded by the consensus node 103a, the consensus node 101a may obtain the target quantity of abnormal verifications for the consensus node 104a recorded by the consensus node 104a, and the consensus node 101a may obtain the target quantity of abnormal verifications for the consensus node 104a recorded by the consensus node 105a.

In some embodiments, the consensus node 101a determines the consensus node corresponding to the target quantity of abnormal verifications greater than an abnormal quantity-of-times threshold as a to-be-checked consensus node according to the at least two consensus nodes according to the target quantity of abnormal verifications of each consensus node counted by the consensus node 101a; obtains a target quantity of abnormal verifications of the to-be-checked consensus node counted by each consensus node; and determines the to-be-checked consensus node as the abnormal consensus node when the target quantity of abnormal verifications of the to-be-checked consensus node counted by each consensus node satisfies a criterion for determining the abnormal consensus node.

The consensus node 101a may determine whether the target quantity of abnormal verifications of the to-be-checked consensus node counted by each consensus node satisfies the criterion for determining the abnormal consensus node in the following manner:

obtain a node quantity of the consensus nodes corresponding to the target quantity of abnormal verifications greater than the abnormal quantity-of-times threshold according to the target quantity of abnormal verifications of the to-be-checked consensus node counted by each consensus node, and obtain a ratio of the node quantity to a total node quantity of the at least two consensus nodes; determine that the target quantity of abnormal verifications of the to-be-checked consensus node counted by each consensus node satisfies the criterion for determining the abnormal consensus node, when the ratio is greater than a ratio threshold; and determine that the target quantity of abnormal verifications of the to-be-checked consensus node counted by each consensus node does not satisfy the criterion for determining the abnormal consensus node, when the ratio is not greater than the ratio threshold.

In some embodiments, after obtaining the target quantity of abnormal verifications recorded by each consensus node, the consensus node 101a may determine whether the consensus node is an abnormal consensus node in the following manner, i.e., may execute step 103b. Step 103b may include:

The consensus node 101a counts a node quantity of the consensus nodes corresponding to the target quantity of abnormal verifications greater than the abnormal quantity-of-times threshold according to the target quantity of abnormal verifications of the consensus node 104a recorded by each consensus node. A node quantity threshold may also be set. If the node quantity is greater than the node quantity threshold, it is determined that the consensus node 104a is an abnormal consensus node (i.e., a result 104b is obtained). If the node quantity is less than or equal to the node quantity threshold, it is determined that the consensus node 104a is not an abnormal consensus node, but a normal consensus node (i.e., a result 105b is obtained). When the consensus node 101a determines that the consensus node 104a is an abnormal consensus node, the consensus node 101a may broadcast the consensus node 104a to other consensus nodes (including the consensus node 102a, the consensus node 103a, the consensus node 104a, and the consensus node 105a), so that the other consensus nodes may add the consensus node 104a to a node blacklist, and at the same time, the consensus node 101a also adds the consensus node 104a to the node blacklist (i.e., step 106b).

After each consensus node adds the consensus node 104a to the node blacklist, it means that the consensus node 104a is kicked out of the blockchain network, and subsequently, the consensus nodes in the blockchain network will not receive any block transaction initiated by the consensus node 104a, where the block transaction may be a request to upload a block to the blockchain, etc. It may be understood that after each consensus node adds the consensus node 104a to the node blacklist, it is equivalent to changing the network architecture of consensus nodes in FIG. 1 (including the consensus node 101a, the consensus node 102a, the consensus node 103a, the consensus node 104a, and the consensus node 105a) into a network architecture 107b of consensus nodes in FIG. 2 (including the consensus node 101a, the consensus node 102a, the consensus node 103a, and the consensus node 105a).

By the method provided by the embodiments of this application, an abnormal consensus node among multiple consensus nodes in a blockchain network can be actively found, and the abnormal consensus node can be kicked out of the blockchain network, thereby ensuring the network security of the blockchain network.

Figure 3:
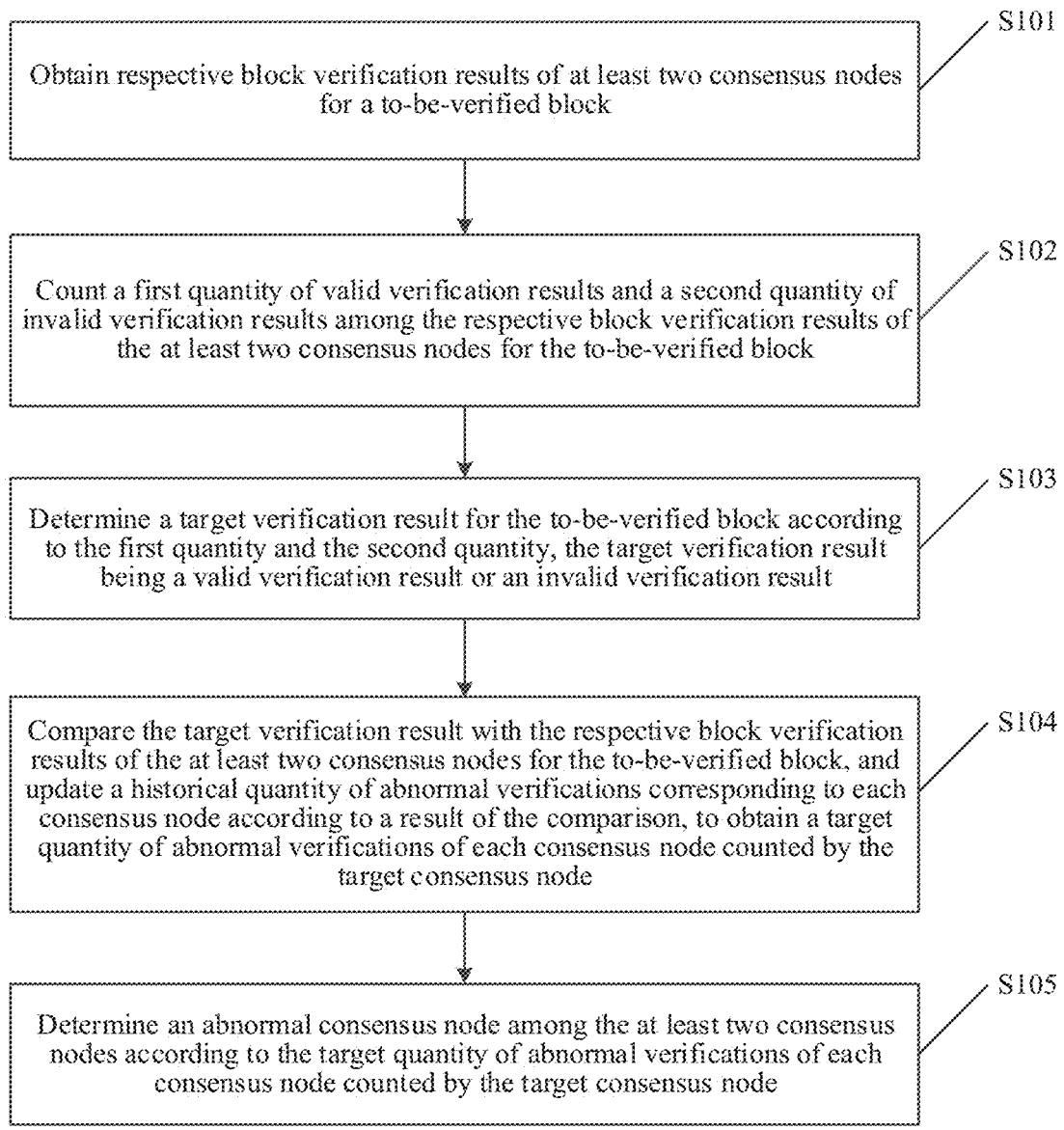
FIG. 3 is a schematic flowchart of a blockchain-based data detection method according to an embodiment of this application.

FIG. 3 is a schematic flowchart of a blockchain-based data detection method according to an embodiment of this application. As shown in FIG. 3, the method may include the following steps.

Step S101. A target consensus node of a blockchain obtains respective block verification results of at least two consensus nodes of the blockchain for a to-be-verified block.

In some embodiments, the target consensus node may be any consensus node in a blockchain network. There may be multiple (at least two) consensus nodes in the blockchain network. The target consensus node may be elected by all consensus nodes in the blockchain network through a voting mechanism. For example, the voting mechanism may be: each consensus node holds two votes, and each consensus node may cast one vote for itself and the other vote for any other consensus node. Finally, a total quantity of votes for each consensus node is counted, and the consensus node with the highest quantity of votes may be used as the target consensus node. For example, it is assumed that there are a consensus node 1, a consensus node 2, and a consensus node 3 in the blockchain network, the consensus node 1 votes for the consensus node 1 and the consensus node 2, the consensus node 2 votes for the consensus node 2 and the consensus node 1, and the consensus node 3 votes for the consensus node 3 and the consensus node 1. In this case, the quantity of votes for the consensus node 1 is 3, the quantity of votes for the consensus node 2 is 2, and the quantity of votes for the consensus node 3 is also 1. Therefore, the consensus node 1 may be used as the target consensus node.

Any block requiring consensus verification in the blockchain network may be referred to as a to-be-verified block. The target consensus node may set a unit time. A start moment of the unit time may be the moment when the target consensus node is determined by voting. The duration of the unit time may be 1 hour, 1 day, or a week, etc. The duration of the unit time is determined depending on actual application scenarios, and is not limited herein. Within this unit time, multiple to-be-verified blocks may be generated in the blockchain network, and only after the verification of a current to-be-verified block by all consensus nodes is complete, will the verification of a next to-be-verified block start. When consensus verification is performed on the block, all the consensus nodes need to perform verification. After performing verification on the block, each consensus node may obtain a block verification result for the block. The block verification result may be briefly referred to as a verification result. Each time after the consensus verification on a to-be-verified block is completed, the target consensus node may obtain the block verification results of other consensus nodes for the block.

The obtaining of block verification results of the consensus nodes for a to-be-verified block is taken as an example for description. The target consensus node may generate a to-be-verified block, and the target consensus node may broadcast the generated to-be-verified block to the other consensus nodes. The other consensus nodes may obtain the block broadcast by the target consensus node, and perform block verification on the block to obtain respective block verification results for the block. After obtaining a block verification result for the block, each consensus node may broadcast the block verification result of itself to the other consensus nodes, so that the block verification result of each consensus node for the block is known to all the consensus nodes. Therefore, the target consensus node may also obtain the block verification result of each consensus node for the block.

It may be understood that the block may be generated by the target consensus node, or may be generated by a consensus node other than the target consensus node. Similarly, if the block is generated by a consensus node other than the target consensus node, the consensus node that generates the block broadcasts the generated to-be-verified block to the other consensus nodes (including the target consensus node) for verification. In this case, the target consensus node may also obtain the block verification result of the consensus node other than the target consensus node for the block.

Step S102. Count a first quantity of valid verification results and a second quantity of invalid verification results among the respective block verification results of the at least two consensus nodes for the block.

In some embodiments, the target consensus node may count the target quantity of abnormal verifications of each consensus node according to the block verification result of each consensus node for the block. The target quantity of abnormal verifications of each consensus node is used for determining whether the each consensus node is an abnormal consensus node. How to obtain a target quantity of abnormal verifications of each consensus node according to block verification results for a to-be-verified block is described as an example below. It may be understood that the same principle applies to the obtaining of a target quantity of abnormal verifications of each consensus node according to block verification results for each to-be-verified block.

The block verification result obtained from the verification of the block by the consensus node may be a valid verification result or an invalid verification result. A block verification result obtained from a verification of a to-be-verified block by a consensus node is either a valid verification result or an invalid verification result. The valid verification result indicates that the block passes the verification by the consensus node, and the invalid verification result indicates that the block fails the verification by the consensus node. A to-be-verified block may include multiple transaction data. If a to-be-verified block passes the verification, it indicates that all the transaction data in the block is authentic and credible. If a to-be-verified block fails the verification, it indicates that some transaction data in the block is not authentic and credible.

The target consensus node may count a quantity of valid verification results and a quantity of invalid verification results in the block verification results of verification of a to-be-verified block by each consensus node (i.e., all the consensus nodes including the target consensus node). The counted quantity of valid verification results may be referred to as a first quantity, and the counted quantity of invalid verification results may be referred to as a second quantity. For example, assume that there are a consensus node 1, a consensus node 2, and a consensus node 3, the block verification result of the consensus node 1 for the block is the valid verification result, the block verification result of the consensus node 2 for the block the invalid verification result, and the block verification result of the consensus node 3 for the block is the invalid verification result. In this case, the first quantity of valid verification results is 1, and the second quantity of invalid verification results is 2.

In the above process, a quantity of block verification votes held by each consensus node is 1 by default. In some embodiments, each consensus node in the blockchain network may have different quantities of block verification votes. For example, the system may assign different quantities of block verification votes to the consensus nodes depending on the degrees of authority of the consensus nodes. A consensus node with a higher degree of authority is assigned a large quantity of block verification votes. For example, assume that there are a consensus node 1, a consensus node 2, a consensus node 3, a consensus node 4, and a consensus node 5. The degrees of authority of the consensus node 1, the consensus node 2, the consensus node 3, the consensus node 4, and the consensus node 5 are in ascending order. In this case, the quantities of block verification votes assigned to the consensus node 1, the consensus node 2, the consensus node 3, the consensus node 4, and the consensus node 5 may be 1, 2, 3, 4 and 5 in sequence.

The first quantity of valid verification results and the second quantity of invalid verification results may be obtained according to the quantity of block verification votes of each consensus node. For example, the consensus node of which the block verification result for the block is the valid verification result among all the consensus nodes may be referred to as a first consensus node; and the consensus node of which the block verification result for the block is the invalid verification result among all the consensus nodes may be referred to as a second consensus node. The block verification vote quantities corresponding to all the first consensus nodes may be added up to obtain a sum, and the sum may be used as the first quantity of valid verification results. The block verification vote quantities corresponding to all the second consensus nodes may be added up to obtain a sum, and the sum may be used as the second quantity of invalid verification results.

For example, it is assumed that the quantities of block verification votes assigned to the consensus node 1, the consensus node 2, the consensus node 3, the consensus node 4, and the consensus node 5 may be 1, 2, 3, 4 and 5 in sequence. The block verification results of the consensus node 1, the consensus node 2, and the consensus node 3 for the block are all invalid verification results. The block verification results of the consensus node 4 and the consensus node 5 for the block are all valid verification results. In this case, the first consensus nodes include the consensus node 1, the consensus node 2, and the consensus node 3, the second consensus nodes include the consensus node 4 and the consensus node 5, the first quantity of valid verification results is 1+2+3=6, and the second quantity of invalid verification results is 4+5=9.

Step S103. Determine a target verification result for the block according to the first quantity and the second quantity, the target verification result being a valid verification result or an invalid verification result;

In some embodiments, When the first quantity of valid verification results is greater than the second quantity of invalid verification results, the target consensus node may use the valid verification result as the target verification result of the block. When the first quantity of valid verification results is less than the second quantity of invalid verification results, the target consensus node may use the invalid verification result as the target verification result of the block. The target verification result indicates a final verification result of all the consensus nodes for the block, which is determined by the target consensus node.

Step S104. Compare the target verification result with the respective block verification results of the at least two consensus nodes for the block, and update a historical quantity of abnormal verifications corresponding to each consensus node according to a result of the comparison, to obtain a target quantity of abnormal verifications of each consensus node counted by the target consensus node.

In some embodiments, there may be multiple to-be-verified blocks, and only after the verification of the current to-be-verified block is complete, will the verification of a next to-be-verified block start. In this embodiment, the target consensus node obtains a target quantity of abnormal verifications of each to-be-verified block through updating according to the block verification result of each consensus node for each to-be-verified block. A quantity of abnormal verifications of each consensus node obtained through updating according to the block verification results corresponding to each to-be-verified block may be referred to as the target quantity of abnormal verifications. In addition, the target quantity of abnormal verifications of each consensus node is obtained by updating the historical quantity of abnormal verifications of each consensus node according to the block verification results corresponding to each to-be-verified block. If the multiple to-be-verified blocks include a to-be-verified block s and the block s is the first to-be-verified block generated in the blockchain network during the period where the target consensus node is voted as a leader consensus node, it indicates that the block s has no predecessor block (i.e., previous block). In this case, the historical quantity of abnormal verifications of each consensus node is a default initial quantity of each consensus node that is initially set. The default initial quantity may be 0. If the block s is not the first to-be-verified block generated in the blockchain network during the period where the target consensus node is voted as the leader consensus node, it indicates that the block has a predecessor block. In this case, the historical quantity of abnormal verifications of each consensus node is a target quantity of abnormal verifications of each consensus node obtained according to block verification results corresponding to the predecessor block of the block.

Therefore, the obtaining the target quantity of abnormal verifications of each consensus node through updating according to the block verification result of each consensus node for the block s means updating a target quantity of abnormal verifications of each consensus node, which is obtained according to block verification results corresponding to the predecessor block of the block s, according to the comparison results corresponding to the block s.

The update process is as follows:

The historical quantity of abnormal verifications (that is, the default initial quantity) of each consensus node initially recorded by the target consensus node may be 0. The target consensus node may compare whether the block verification result of each consensus node for the block is the same as the target verification result. The consensus node of which the block verification result is determined by the target consensus node to be different from the target verification result is referred to as a conflicting consensus node. The consensus node of which the block verification result is determined by the target consensus node to be the same as the target verification result may be referred to as a matching consensus node. The historical quantity of abnormal verifications corresponding to the conflicting consensus node may be increased by a unit abnormal quantity to obtain the target quantity of abnormal verifications corresponding to the conflicting consensus node. The unit abnormal quantity may be set by the target consensus node, for example, may be set to 1. The historical quantity of abnormal verifications corresponding to the matching consensus node may be directly used as the target quantity of abnormal verifications of the matching consensus node. When a block verification result of a next to-be-verified block is used to obtain the target quantity of abnormal verifications of each consensus node, a target quantity of abnormal verifications of each consensus node obtained according to a block verification result of the previous to-be-verified block is used as the historical quantity of abnormal verifications of each consensus node.

Figure 4:
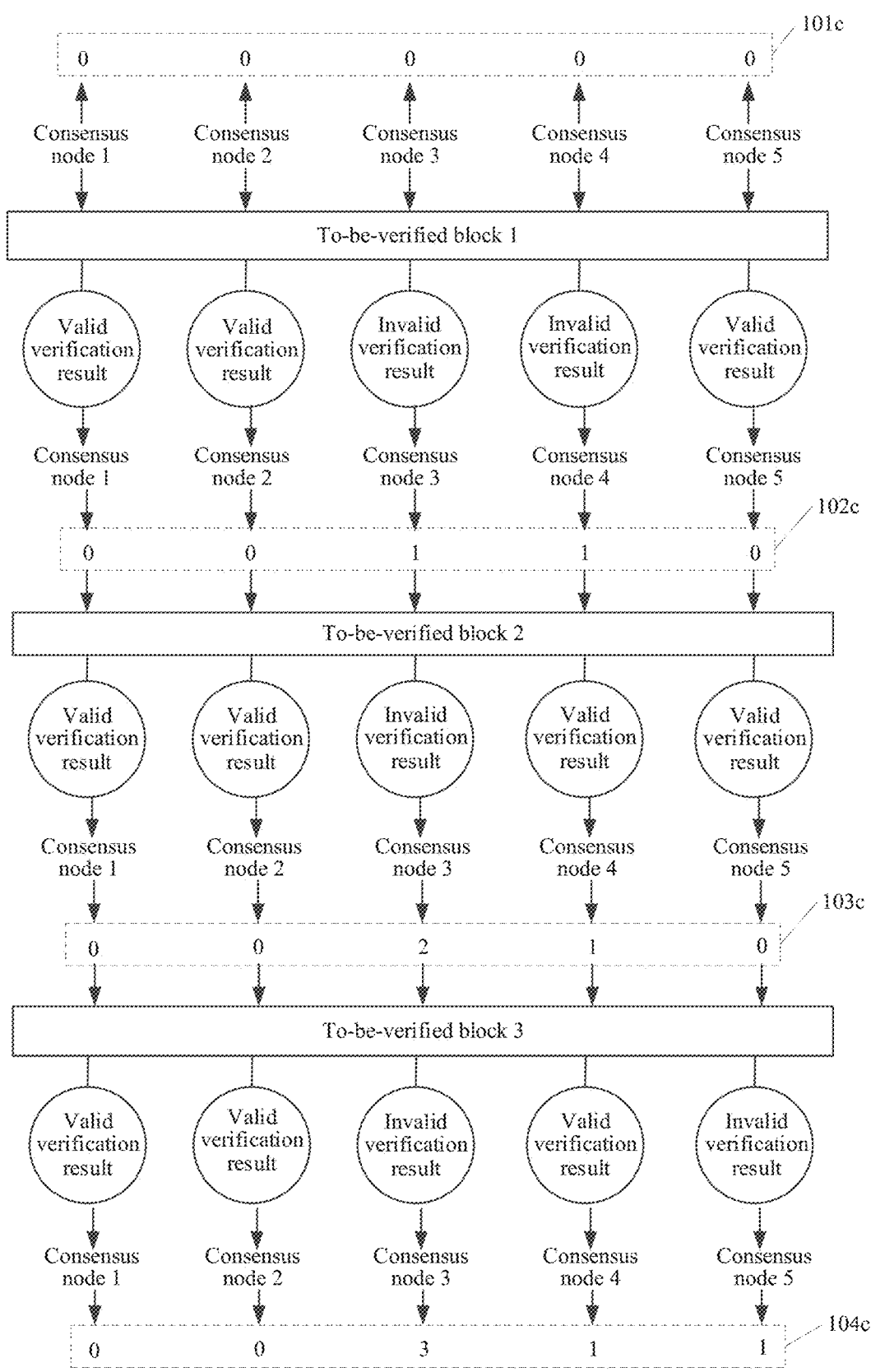
FIG. 4 is a schematic diagram of a scenario of obtaining a quantity of abnormal verifications according to an embodiment of this application.

For example, refer to FIG. 4, which is a schematic diagram of a scenario of obtaining a quantity of abnormal verifications according to an embodiment of this application. As shown in FIG. 4, an area 101c shows the historical quantities of abnormal verifications of the consensus nodes (which may include the target consensus node itself) initially recorded by the target consensus node, which are all 0. The target consensus node may be any one of the consensus node 1, the consensus node 2, the consensus node 3, the consensus node 4, and the consensus node 5. The area 101c shows that an initial historical quantity of abnormal verifications of the consensus node 1 is 0, an initial historical quantity of abnormal verifications of the consensus node 2 is 0, an initial historical quantity of abnormal verifications of the consensus node 3 is 0, an initial historical quantity of abnormal verifications of the consensus node 4 is 0, and an initial historical quantity of abnormal verifications of the consensus node 5 is 0.

Next, when consensus verification is performed on a to-be-verified block 1, the target consensus node obtains that a block verification result of the consensus node 1 for the block 1 is the valid verification result, a block verification result of the consensus node 2 for the block 1 is the valid verification result, a block verification result of the consensus node 3 for the block 1 is the invalid verification result, a block verification result of the consensus node 1 for the block 4 is the invalid verification result, and a block verification result of the consensus node 5 for the block 1 is the valid verification result. Assuming that the block verification vote quantity of each consensus node is 1, the first quantity of valid verification results for the block 1 is 3, and the second quantity of invalid verification results for the block 1 is 2. Since the first quantity being 3 is greater than the second quantity being 2, the target verification result of the block 1 is the valid verification result.

In this case, the historical quantity of abnormal verifications of each consensus node is the values shown in the area 101c. Since the respective block verification results of the consensus node 1, the consensus node 2, and the consensus node 5 for the block 1 are the same as the target verification result of the block 1, the historical quantity of abnormal verifications of the consensus node 1 being 0 in the area 101c may be directly used as the target quantity of abnormal verifications of the consensus node 1, the historical quantity of abnormal verifications of the consensus node 2 being 0 in the area 101c may be directly used as the target quantity of abnormal verifications of the consensus node 2, and the historical quantity of abnormal verifications of the consensus node 5 being 0 in the area 101c may be directly used as the target quantity of abnormal verifications of the consensus node 5.

Assuming that the unit abnormal quantity is 1, since the respective block verification results of the consensus node 3 and the consensus node 4 for the block 1 are different from the target verification result of the block 1, the historical quantity of abnormal verifications of the consensus node 3 being 0 in the area 101c may be increased by the unit abnormal quantity being 1 to obtain a result of 1, which is used as the target quantity of abnormal verifications of the consensus node 3, and the historical quantity of abnormal verifications of the consensus node 4 being 0 in the area 101c may be increased by the unit abnormal quantity being 1 to obtain a result of 1, which is used as the target quantity of abnormal verifications of the consensus node 4.

Therefore, the target quantity of abnormal verifications of each consensus node obtained according to the block verification results corresponding to the block 1 is the values shown in the area 102c, and the target quantity of abnormal verifications of each consensus node shown in the area 102c is as follows: the target quantity of abnormal verifications of the consensus node 1 is 0, the target quantity of abnormal verifications of the consensus node 2 is 0, the target quantity of abnormal verifications of the consensus node 3 is 1, the target quantity of abnormal verifications of the consensus node 4 is 1, and the target quantity of abnormal verifications of the consensus node 5 is 0.

Next, a to-be-verified block 2 is a to-be-verified block next to the block 1, that is, the block 1 is a predecessor block of the block 2. A block verification result of the consensus node 1 for the block 2 is the valid verification result, a block verification result of the consensus node 2 for the block 2 is the valid verification result, a block verification result of the consensus node 3 for the block 2 is the invalid verification result, a block verification result of the consensus node 2 for the block 4 is the valid verification result, and a block verification result of the consensus node 5 for the block 2 is the valid verification result. Therefore, the first quantity of valid verification results for the block 2 is 4, the second quantity of invalid verification results for the block 2 is 1, and the target verification result of the block 2 is a valid verification result.

In this case, the target quantity of abnormal verifications of each consensus node shown in the area 102c is used as the historical quantity of abnormal verifications of each consensus node. Therefore, since the respective block verification results of the consensus node 1, the consensus node 2, the consensus node 4, and the consensus node 5 for the block 2 are the same as the target verification result of the block 2, the historical quantity of abnormal verifications of the consensus node 1 being 0 in the area 102c may be used as the target quantity of abnormal verifications of the consensus node 1 at this moment, the historical quantity of abnormal verifications of the consensus node 2 being 0 in the area 102c may be used as the target quantity of abnormal verifications of the consensus node 2 at this moment, the historical quantity of abnormal verifications of the consensus node 4 being 1 in the area 102c may be used as the target quantity of abnormal verifications of the consensus node 4 at this moment, and the historical quantity of abnormal verifications of the consensus node 5 being 0 in the area 102c may be used as the target quantity of abnormal verifications of the consensus node 5 at this moment.

Since the block verification result of the consensus node 3 for the block 2 is different from the target verification result of the block 2, the historical quantity of abnormal verifications of the consensus node 3 being 1 in the area 102c may be increased by the unit abnormal quantity being 1 to obtain a result of 2, which is used as the target quantity of abnormal verifications of the consensus node 3 at this moment.

Therefore, the target quantity of abnormal verifications of each consensus node obtained according to the block verification results corresponding to the block 2 is the values shown in an area 103c, and the target quantity of abnormal verifications of each consensus node shown in the area 103c is as follows: the target quantity of abnormal verifications of the consensus node 1 is 0, the target quantity of abnormal verifications of the consensus node 2 is 0, the target quantity of abnormal verifications of the consensus node 3 is 2, the target quantity of abnormal verifications of the consensus node 4 is 1, and the target quantity of abnormal verifications of the consensus node 5 is 0.

Next, a to-be-verified block 3 is a to-be-verified block next to the block 2, that is, the block 2 is a predecessor block of the block 3. A block verification result of the consensus node 1 for the block 3 is the valid verification result, a block verification result of the consensus node 2 for the block 3 is the valid verification result, a block verification result of the consensus node 3 for the block 3 is the invalid verification result, a block verification result of the consensus node 3 for the block 4 is the valid verification result, and a block verification result of the consensus node 5 for the block 3 is the invalid verification result. Therefore, the first quantity of valid verification results for the block 3 is 3, the second quantity of invalid verification results for the block 3 is 2, and the target verification result of the block 3 is a valid verification result.

In this case, the target quantity of abnormal verifications of each consensus node shown in the area 103c is used as the historical quantity of abnormal verifications of each consensus node. Therefore, since the respective block verification results of the consensus node 1, the consensus node 2, and the consensus node 4 for the block 3 are the same as the target verification result of the block 3, the historical quantity of abnormal verifications of the consensus node 1 being 0 in the area 103c may be used as the target quantity of abnormal verifications of the consensus node 1 at this moment, the historical quantity of abnormal verifications of the consensus node 2 being 0 in the area 103c may be used as the target quantity of abnormal verifications of the consensus node 2 at this moment, and the historical quantity of abnormal verifications of the consensus node 4 being 1 in the area 103c may be used as the target quantity of abnormal verifications of the consensus node 4 at this moment.

Since the block verification results of the consensus node 3 and the consensus node 5 for the block 3 are different from the target verification result of the block 3, the historical quantity of abnormal verifications of the consensus node 3 being 2 in the area 103c may be increased by the unit abnormal quantity being 1 to obtain a result of 3, which is used as the target quantity of abnormal verifications of the consensus node 3 at this moment, and the historical quantity of abnormal verifications of the consensus node 5 being 0 in the area 103c may be increased by the unit abnormal quantity being 1 to obtain a result of 1, which is used as the target quantity of abnormal verifications of the consensus node 5 at this moment.

Therefore, the target quantity of abnormal verifications of each consensus node obtained according to the block verification results corresponding to the block 3 is the values shown in an area 104c, and the target quantity of abnormal verifications of each consensus node shown in the area 104c is as follows: the target quantity of abnormal verifications of the consensus node 1 is 0, the target quantity of abnormal verifications of the consensus node 2 is 0, the target quantity of abnormal verifications of the consensus node 3 is 3, the target quantity of abnormal verifications of the consensus node 4 is 1, and the target quantity of abnormal verifications of the consensus node 5 is 1. Similarly, if there is a to-be-verified block after the block 3, the principle of obtaining a target quantity of abnormal verifications of each consensus node based on block verification results corresponding to the block is the same as the principle of the above process.

Step S105. Determine an abnormal consensus node among the at least two consensus nodes according to the target quantity of abnormal verifications of each consensus node counted by the target consensus node.

In some embodiments, the target consensus node may detect an abnormal consensus node among the multiple consensus nodes in the blockchain network according to the target quantity of abnormal verifications of each consensus node counted by itself, where the abnormal consensus node threatens the network security of the blockchain network. The target quantity of abnormal verifications of each consensus node used by the target consensus node to detect the abnormal consensus node among the multiple consensus nodes is the latest target quantity of abnormal verifications of each consensus node that is currently counted. For example, assuming that the block 3 in FIG. 4 is a latest to-be-verified block generated and verified. i.e., there is no to-be-verified block next to the block 3, the target consensus node may determine whether there is an abnormal consensus node among the multiple consensus nodes at this moment according to the target quantity of abnormal verifications of each consensus node shown in the area 104c.

The target consensus node may detect in real time the latest target quantity of abnormal verifications of each consensus node that is counted. When finding that the target quantity of abnormal verifications of a consensus node recorded by the target consensus node in a unit time (which the unit time in step S101 above) (e.g., at any moment before the end moment of the unit time is reached) is greater than the abnormal quantity-of-times threshold, the target consensus node may use the consensus node as a to-be-checked consensus node. It may be understood that each consensus node in the blockchain network counts the target quantity of abnormal verifications of each consensus node by itself, and the process of counting the abnormal quantities of target verifications of the consensus nodes by each consensus node is the same as the process of counting the target quantity of abnormal verifications of each consensus node by the target consensus node. Therefore, it may be understood that each consensus node counts a target quantity of abnormal verifications of the to-be-checked consensus node.

The target consensus node may obtain, from other consensus nodes, target quantities of abnormal verifications of the to-be-checked consensus node that are respectively counted by the other consensus nodes at this moment. The target quantities of abnormal verifications for the to-be-checked consensus node that are obtained by the target consensus node from the other consensus nodes are latest target quantities of abnormal verifications of the to-be-checked consensus node that are currently counted by the other consensus nodes. For example, if the blockchain network includes the consensus node 1, the consensus node 2, and the consensus node 3 in addition to the target consensus node, the target consensus node may obtain a latest target quantity of abnormal verifications of the to-be-checked consensus node counted by the consensus node 1, a latest target quantity of abnormal verifications of the to-be-checked consensus node counted by the consensus node 2, and a latest target quantity of abnormal verifications of the to-be-checked consensus node counted by the consensus node 3.

The target consensus node may count a node quantity of the consensus nodes corresponding to the target quantity of abnormal verifications greater than the abnormal quantity-of-times threshold according to the target quantity of abnormal verifications of the to-be-checked consensus node that is obtained by each consensus node. For example, if the consensus nodes in the blockchain network include the target consensus node, the consensus node 1, the consensus node 2, and the consensus node 3, the target quantities of abnormal verifications of the to-be-checked consensus node counted by the target consensus node, the consensus node 1, and the consensus node 2 are greater than the abnormal quantity-of-times threshold, and the target quantity of abnormal verifications of the to-be-checked consensus node counted by the consensus node 3 is less than the abnormal quantity-of-times threshold, the node quantity counted by the target consensus node is 3.

The target consensus node may further obtain a ratio of the counted node quantity to the total node quantity of all the consensus nodes. If the ratio is greater than a ratio threshold, the target consensus node may determine the to-be-checked consensus node as an abnormal consensus node. If the ratio is less than or equal to the ratio threshold, the target consensus node may determine the to-be-checked consensus node as a normal consensus node. The ratio threshold may be set according to actual situations. For example, the ratio threshold may be 1/2, indicating that if the target quantities of abnormal verifications of the to-be-checked consensus node counted by more than half of the consensus nodes are greater than the abnormal quantity-of-times threshold, it may be determined that the to-be-checked consensus node is an abnormal consensus node.

Each consensus node may maintain a node blacklist, and any consensus node added to the node blacklist of one consensus node can no longer initiate a transaction to the one consensus node. The transaction may be a transaction requesting to upload a block to the blockchain. For example, if the consensus node 1 adds the consensus node 2 to its own node blacklist, the consensus node 2 can no longer initiate a transaction to the consensus node 1. If the target consensus node determines that the to-be-checked consensus node is an abnormal consensus node, the target consensus node may broadcast the abnormal consensus node to every other consensus node, so that every other consensus node may add the abnormal consensus node to its own node blacklist, and the target consensus node itself also adds the abnormal consensus node to its node blacklist. If each consensus node has added the abnormal consensus node to the node blacklist, it means that the abnormal consensus node has been kicked out of the blockchain network. By kicking the abnormal consensus node out of the blockchain network, the network security of the blockchain network can be improved.

In some embodiments, w % ben the target consensus node determines that the to-be-checked consensus node is a normal consensus node according to the target quantity of abnormal verifications of the to-be-checked consensus node counted by each consensus node, then, subsequently each time the target quantity of abnormal verifications of the to-be-checked consensus node counted by the target consensus node is increased by 1 (where the increase may be set by the target consensus node, and may be 2) in a unit time, the target consensus node may obtain, again from the other consensus nodes, the target quantities of abnormal verifications of the to-be-checked consensus node counted by the other consensus nodes, and then determine again whether the to-be-checked consensus node is an abnormal consensus node according to the obtained target quantities of abnormal verifications of the to-be-checked consensus node counted by the other consensus nodes. This process may continue until the end moment of the unit time is reached.

In some embodiments, when the target consensus node detects that the end moment of the unit time is reached, the target consensus node may clear the target quantity of abnormal verifications of each consensus node currently counted by the target consensus node, and reset the target quantity of abnormal verifications of each consensus node to 0. The target consensus node may also instruct the other consensus nodes to reset the target quantity of abnormal verifications of each consensus node currently counted by the target consensus node to 0. After the target quantity of abnormal verifications of each consensus node counted by each consensus node is reset to 0, each consensus node may use the reset moment as a start moment of a next unit time to re-count the target quantity of abnormal verifications of each consensus node. In the next unit time, the target consensus node may detect whether there is an abnormal consensus node among the multiple consensus nodes again. The detection process is the same as the above process.

In some embodiments, the target consensus node which is the execution entity in this embodiment may be re-elected by voting after a period of time. The period of time may be set to be of a certain duration, or may be determined by a block height of a block to be traded. For example, by using the moment when the target consensus node is determined by voting as a start moment, after 24 hours (or 5 hours, 30 hours, etc.) after the start moment, a new target consensus node is elected by voting by all the consensus nodes in the blockchain network based on a voting mechanism. In fact, the new target consensus node re-elected by voting may be the original target consensus node.

Alternatively, the target consensus node may detect a maximum block height of a to-be-verified block (where the block is a block generated during the process of the target consensus node detecting whether there is an abnormal consensus node). When a height difference between the maximum block height and a verification start height is greater than a height difference threshold (which may be set by the target consensus node), the target consensus node may transmit a voting request to other consensus nodes, so that all the consensus nodes in the blockchain network may re-vote to elect a new target consensus node according to the voting request and a voting mechanism. The verification start height is a maximum block height of a block existing in a ledger of the target consensus node at the moment when the target consensus node is determined by all the consensus nodes by voting.

For example, when the target consensus node is determined by voting, the maximum block height of a block held by the target consensus node is 10, and after a period of time starting from the moment when the target consensus node is determined by voting, 20 new blocks have been generated (where the 20 blocks are all blocks to be verified). In this case, the total quantity of blocks held by the target consensus node is 10+20=30, that is, the maximum block height of the block is 30, the verification start height is 10, and the height difference is 20. If the height difference threshold is 20, the target consensus node may transmit a voting request to other consensus nodes to re-vote to elect a new target consensus node.

Figure 5:
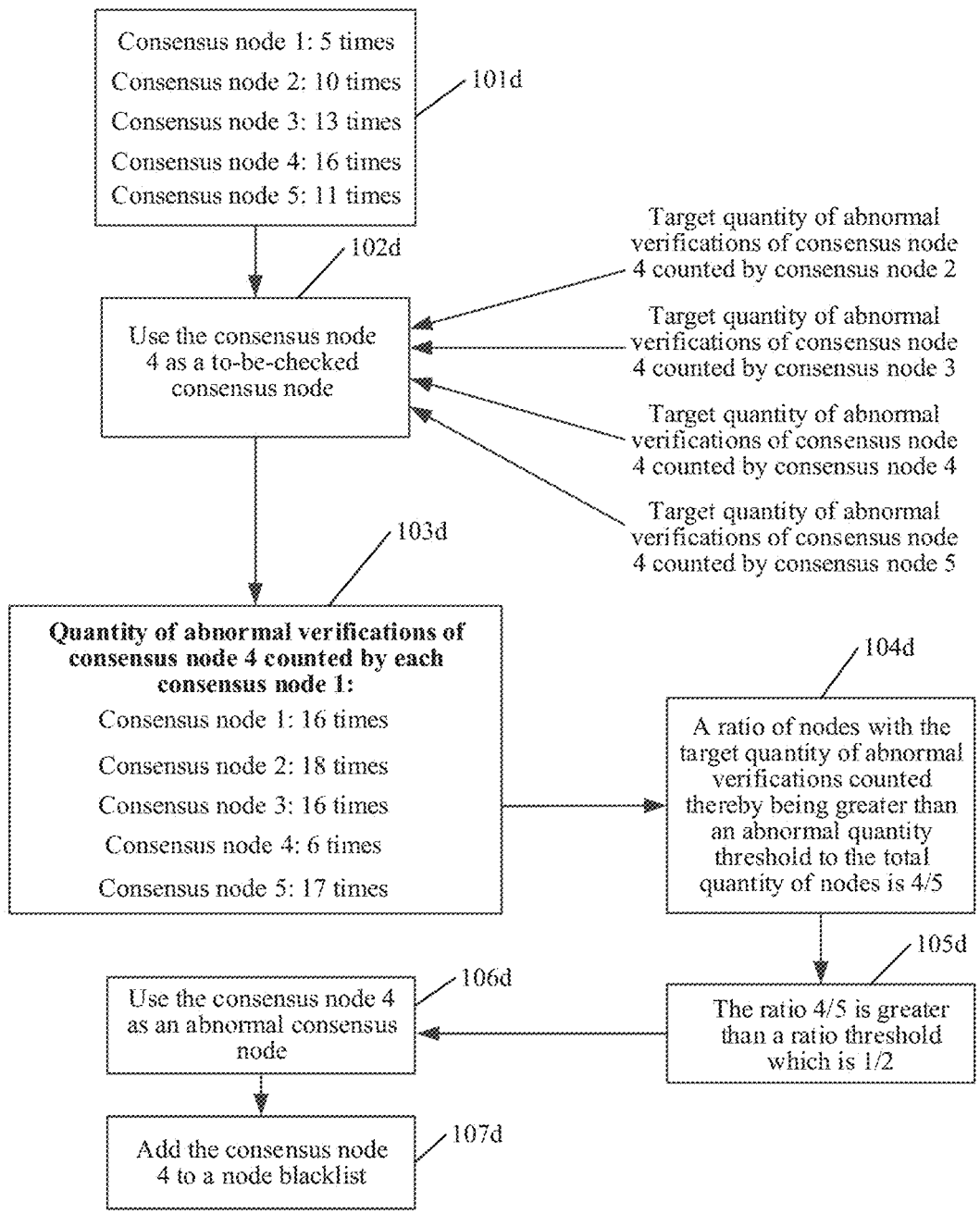
FIG. 5 is a schematic diagram of a scenario of detecting an abnormal consensus node according to an embodiment of this application.

FIG. 5 is a schematic diagram of a scenario of detecting an abnormal consensus node according to an embodiment of this application. As shown in FIG. 5, assuming that the target consensus node is the consensus node 1, the target quantity of abnormal verifications of each consensus node counted by the target consensus node is as shown in an area 101d: the target quantity of abnormal verifications of the consensus node 1 is 5, the target quantity of abnormal verifications of the consensus node 2 is 10, the target quantity of abnormal verifications of the consensus node 3 is 13, the target quantity of abnormal verifications of the consensus node 4 is 16, and the target quantity of abnormal verifications of the consensus node 5 is 11. If the abnormal quantity-of-times threshold is 15, then the target consensus node may detect that the target quantity of abnormal verifications of the consensus node 4 counted by the target consensus node has exceeded the abnormal quantity-of-times threshold, and the target consensus node may use the consensus node 4 as the to-be-checked consensus node (as in step 102d).

Next, the target consensus node may obtain, from the consensus node 2, a target quantity of abnormal verifications of the consensus node 4 counted by the consensus node 2; obtain, from the consensus node 3, a target quantity of abnormal verifications of the consensus node 4 counted by the consensus node 3; obtain, from the consensus node 4, a target quantity of abnormal verifications of the consensus node 4 counted by the consensus node 4, and obtain, from the consensus node 5, a target quantity of abnormal verifications of the consensus node 4 counted by the consensus node 5. The target quantities of abnormal verifications of the consensus nodes counted by each consensus node that are obtained by the target consensus node are as shown in an area 103d: a target quantity of abnormal verifications of the consensus node 4 recorded by the consensus node 1 is 16, a target quantity of abnormal verifications of the consensus node 4 recorded by the consensus node 2 is 18, a target quantity of abnormal verifications of the consensus node 4 recorded by the consensus node 3 is 16, a target quantity of abnormal verifications of the consensus node 4 recorded by the consensus node 4 is 6, and a target quantity of abnormal verifications of the consensus node 4 recorded by the consensus node 5 is 17. Then, the node quantity of consensus nodes of which the target quantity of abnormal verifications is greater than the abnormal quantity-of-times threshold being 15 is 4 (including the consensus node 1, the consensus node 2, the consensus node 3, and the consensus node 5). A ratio of the node quantity to the total node quantity of consensus nodes being 5 is 4/5. Assuming that the ratio threshold is 1/2, since 4/5 is greater than 1/2, the target consensus node may determine the consensus node 4 as an abnormal consensus node (as in step 106d). The target consensus node may broadcast the consensus node 4 to the other consensus nodes, so that each consensus node may add the consensus node 4 to its own node blacklist (as in step 107d), to kick the consensus node 4 out of the blockchain network.

By the embodiments of this application, an abnormal consensus node can be detected from at least two consensus nodes. By actively discovering an abnormal consensus node in a blockchain network and performing corresponding processing on the abnormal consensus node (for example, adding the abnormal consensus to a blacklist), the network security of the blockchain network is improved.

Figure 6:
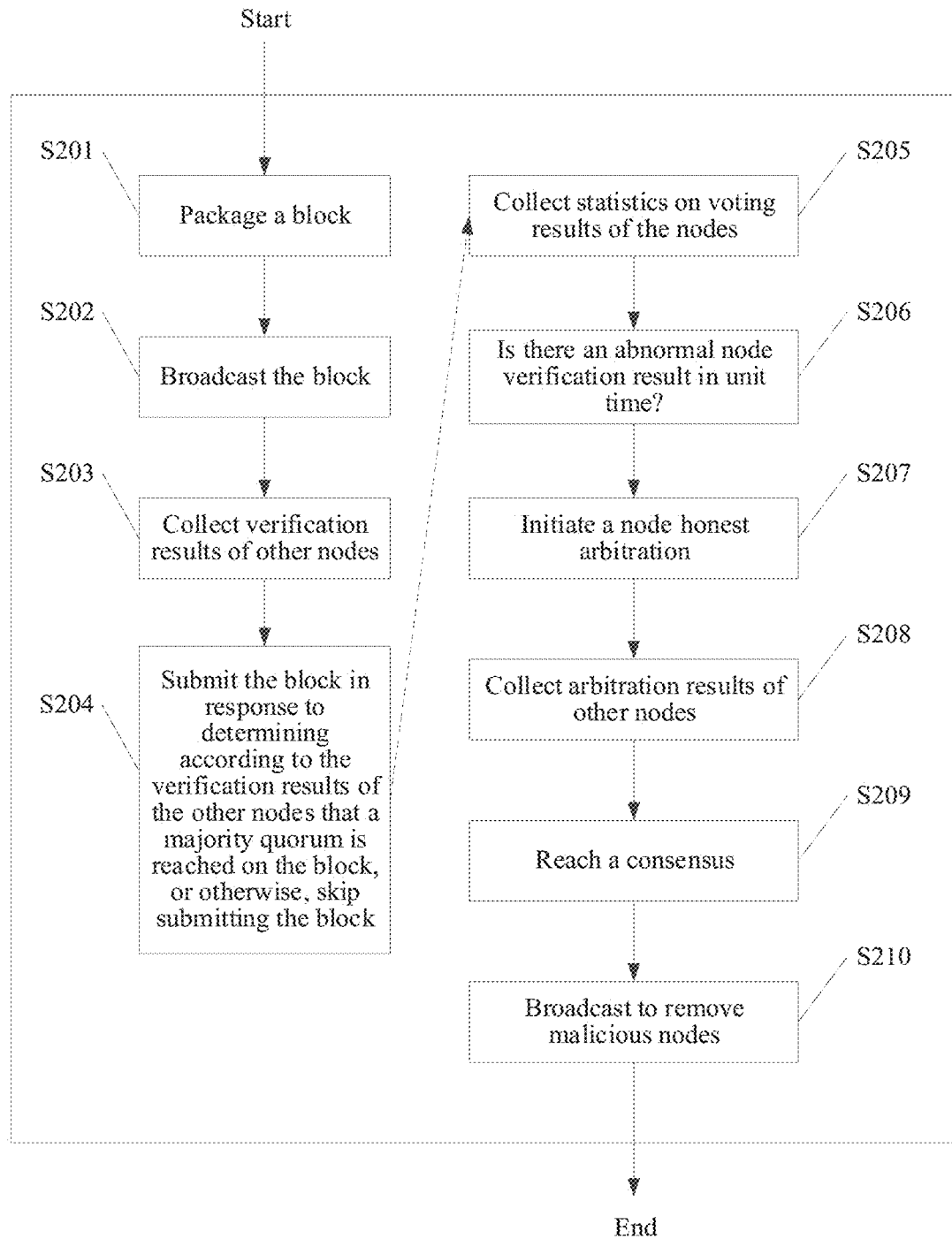
FIG. 6 is a schematic flowchart of a method for removing an abnormal consensus node according to an embodiment of this application.

FIG. 6 is a schematic flowchart of a method for removing an abnormal consensus node according to an embodiment of this application. As shown in FIG. 6, the method may include the following steps:

Step S201. A consensus node in a blockchain network package a block.

In some embodiments, any consensus node in the blockchain network can package a block. The consensus node that performs the block packaging operation is referred to as a target consensus node, and the packaged block is used as a to-be-verified block.

Step S202. Broadcast the block.

In some embodiments, the consensus node that packages the block may broadcast the packaged to-be-verified block to other consensus nodes, so that the other consensus nodes may perform block verification on the broadcast to-be-verified block to obtain block verification results for the block.

Step S203. Collect the verification results of the other nodes.

In some embodiments, the target consensus node collects the verification results (i.e., block verification results) of the other consensus nodes in the blockchain network for the block.

Step S204. Submit the block in response to determining according to the verification results of the other nodes that a majority quorum is reached on the block, or otherwise, skip submitting the block In some embodiments, the above process is a consensus process for the block. Reaching a majority quorum may mean that the block verification results of more than half of the consensus nodes for the block are the valid verification result. If the target consensus node detects that a majority quorum is reached on the block, the target consensus node may upload the block to the blockchain, that is, add the block to its own ledger. If the target consensus node detects that a majority quorum is not reached on the block, the target consensus node does not upload the block to the blockchain.

Step S205. Collect statistics on voting results of the nodes.

In some embodiments, step S205 is a step in parallel with step S204. Collecting statistics on the voting results of the nodes refers to collecting statistics on the block verification results of the consensus nodes for the block. The target consensus node may count a target quantity of abnormal verifications of each consensus node according to the block verification result of each consensus node for the block. For this process, reference may be made to steps S101-S104 above.

Step S206. Detect whether there is an abnormal node verification result in unit time.

In some embodiments, the target consensus node may detect whether a target quantity of abnormal verifications of each consensus node collected in unit time is greater than an abnormal quantity-of-times threshold. If the target quantity of abnormal verifications of a consensus node is greater than the abnormal quantity-of-times threshold, it indicates that the node verification result of the consensus node is abnormal, and the consensus node may be regarded as the to-be-checked consensus node described above.

Step S207. Initiate a node honest arbitration;

In some embodiments, initiating an honest arbitration means initiating a vote. The target consensus node may initiate a vote to other consensus nodes, that is, to vote on whether the to-be-checked consensus node is an abnormal consensus node.

Step S208. Collect arbitration results of the other nodes.

In some embodiments, the honest arbitration is implemented as follows: the target consensus node may obtain target quantities of abnormal verifications counted by the other consensus nodes for the to-be-checked consensus node, and the target consensus node may determine whether there is an abnormal consensus node among the multiple consensus nodes according to the target quantity of abnormal verifications counted by each consensus node for the to-be-checked consensus node.

Step S209: Reach a consensus.

In some embodiments, if the target consensus node determines that the target quantities of abnormal verifications counted by most of the consensus nodes (for example, more than half of the consensus nodes) for the to-be-checked consensus node are greater than the abnormal quantity-of-times threshold, it means that the consensus nodes have reached a consensus on that the to-be-checked consensus node is an abnormal consensus node.

Step S210. Broadcast to remove malicious nodes.

In some embodiments, a malicious node is an abnormal consensus node, and the target consensus node may broadcast the abnormal consensus node (that is, the to-be-checked consensus node) to the other consensus nodes, so that each consensus node may add the abnormal consensus node to a node blacklist to kick the abnormal consensus node out of the blockchain network.

By the embodiments of this application, an abnormal consensus node can be detected from at least two consensus nodes. By actively discovering an abnormal consensus node in a blockchain network and performing corresponding processing on the abnormal consensus node (for example, adding the abnormal consensus to a blacklist), the network security of the blockchain network is improved.

Figure 7:
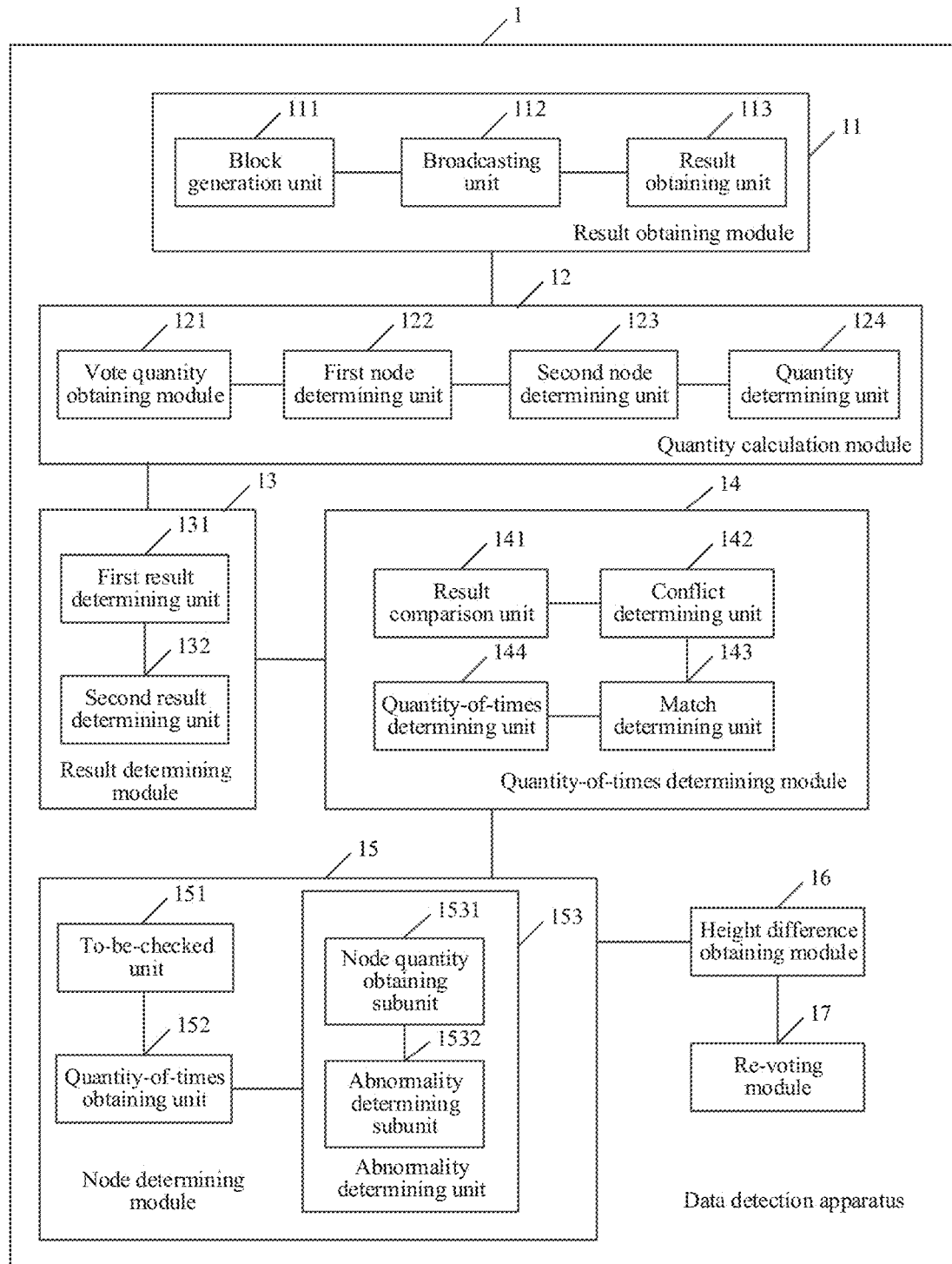
FIG. 7 is a schematic structural diagram of a blockchain-based data detection apparatus according to an embodiment of this application.

FIG. 7 is a schematic structural diagram of a blockchain-based data detection apparatus according to an embodiment of this application. In some embodiments, the blockchain-based data detection apparatus may be implemented by software, for example, may be a computer program (including program code) running in a computer device. For example, the blockchain-based data detection apparatus is an application software. The apparatus may also be implemented by hardware, for example, by a processor in the form of a hardware decoding processor, which is programmed to execute the blockchain-based data detection method provided by the embodiments of this application. For example, the processor in the form of a hardware decoding processor may be one or more Application Specific Integrated Circuits (ASICs), DSPs, Programmable Logic Devices (PLDs), Complex Programmable Logic Devices (CPLDs), Field Programmable Gate Arrays (FPGAs), or other electronic components. In some embodiments, the apparatus may also be implemented by a combination of software and hardware.

The data detection apparatus may be configured to execute the corresponding steps in the method provided in the embodiments of this application. The data detection apparatus may also be applicable to a target consensus node. As shown in FIG. 7, the data detection apparatus 1 may include, a result obtaining module 11, a quantity calculation module 12, a result determining module 13, a quantity-of-times determining module 14, and a node determining module 15.

The result obtaining module 11 is configured to obtain respective block verification results of at least two consensus nodes for a to-be-verified block.

The quantity calculation module 12 is configured to count a first quantity of valid verification results and a second quantity of invalid verification results among the respective block verification results of the at least two consensus nodes for the block.

The result determining module 13 is configured to determine a target verification result for the block according to the first quantity and the second quantity, the target verification result being a valid verification result or an invalid verification result;

The quantity-of-times determining module 14 is configured to compare the target verification result with the respective block verification results of the at least two consensus nodes for the block, and update a historical quantity of abnormal verifications corresponding to each consensus node according to a result of the comparison, to obtain a target quantity of abnormal verifications of each consensus node counted by the target consensus node.

The node determining module 15 is configured to determine an abnormal consensus node among the at least two consensus nodes according to the target quantity of abnormal verifications of each consensus node counted by the target consensus node.

For implementations of functions of the result obtaining module 11, the quantity calculation module 12, the result determining module 13, the quantity-of-times determining module 14, and the node determining module 15, reference may be made to step S101 to step S105 in the embodiment corresponding to FIG. 3, which will not be repeated here.

The result obtaining module 11 includes: a block generation unit 111, a broadcasting unit 112, and a result obtaining unit 113.

The block generation unit 111 is configured to generate the block.

The broadcasting unit 112 is configured to broadcast the block to each consensus node, so that each consensus node performs block verification on the block.

The result obtaining unit 113 is configured to obtain the block verification result of each consensus node for the block.

For implementations of functions of the block generation unit 111, the broadcasting unit 112, and the result obtaining unit 113, reference may be made to step S101 in the embodiment corresponding to FIG. 3, which will not be repeated here.

The result determining module 13 includes: a first result determining unit 131 and a second result determining unit 132.

The first result determining unit 131 is configured to determine the valid verification result as the target verification result when the first quantity is greater than the second quantity.

The second result determining unit 132 is configured to determine the invalid verification result as the target verification result when the first quantity is less than the second quantity.

For implementations of functions of the first result determining unit 131 and the second result determining unit 132, reference may be made to step S103 in the embodiment corresponding to FIG. 3, which will not be repeated here.

The quantity calculation module 12 includes: a vote quantity obtaining module 121, a first node determining unit 122, a second node determining unit 123, and a quantity determining unit 124.

The vote quantity obtaining module 121 is configured to obtain a block verification vote quantity corresponding to each consensus node.

The first node determining unit 122 is configured to determine the consensus node of which the block verification result is the valid verification result as a first consensus node according to the respective block verification results of the at least two consensus nodes for the block.

The second node determining unit 123 is configured to determine the consensus node of which the block verification result is the invalid verification result as a second consensus node according to the respective block verification results of the at least two consensus nodes for the block.

The quantity determining unit 124 is configured to determine a sum of the block verification vote quantities corresponding to the first consensus nodes as the first quantity, and determining a sum of the block verification vote quantities corresponding to the second consensus nodes the second quantity.

For implementations of functions of the vote quantity obtaining module 121, the first node determining unit 122, the second node determining unit 123, and the quantity determining unit 124, reference may be made to step S102 in the embodiment corresponding to FIG. 3, which will not be repeated here.

The target consensus node is determined by voting by the at least two consensus nodes based on a voting mechanism; and The data detection apparatus 1 further includes: a height difference obtaining module 16 and a re-voting module 17.

The height difference obtaining module 16 is configured to obtain a block height of the block, and obtain a height difference between the block height and a verification start height, the verification start height being a maximum block height of a block held by the target consensus node when the target consensus node is determined by voting based on the voting mechanism.

The re-voting module 17 is configured to transmit a voting request to each consensus node when the height difference is greater than a height difference threshold, so that each consensus node revotes on the target consensus node according to the voting request and the voting mechanism.

For implementations of specific functions of the height difference obtaining module 16 and the re-voting module 17, and the verification module 17, reference may be made to step S105 in the embodiment corresponding to FIG. 3, which will not be repeated here.

The quantity-of-times determining module 14 includes: a result comparison unit 141, a conflict determining unit 142, a match determining unit 143, and a quantity-of-times determining unit 144.

The result comparison unit 141 is configured to compare the target verification result with the respective block verification results of the at least two consensus nodes for the block.

The conflict determining unit 142 is configured to determine the consensus node corresponding to the block verification result different from the target verification result as a conflicting consensus node according to the respective block verification results of the at least two consensus nodes for the block.

The matching determining unit 143 is configured to determine, among the at least two consensus nodes, consensus nodes other than the conflicting consensus nodes as matching consensus nodes.

The quantity-of-times determining unit 144 is configured to increase the historical quantities of abnormal verifications corresponding to the conflicting consensus nodes by a unit abnormal quantity to obtain target quantities of abnormal verifications corresponding to the conflicting consensus nodes, and determine the historical quantities of abnormal verifications corresponding to the matching consensus nodes as target quantities of abnormal verifications corresponding to the matching consensus node, where, when the block does not have a predecessor block, the historical quantity of abnormal verifications corresponding to each consensus node is a default initial quantity; and when the block has a predecessor block, the historical quantity of abnormal verifications corresponding to each consensus node is a quantity of abnormal verifications of each consensus node that is obtained based on block verification results of the at least two consensus nodes for the predecessor block.

For implementations of functions of the result comparison unit 141, the conflict determining unit 142, the match determining unit 143, and the quantity-of-times determining unit 144, reference may be made to step S104 in the embodiment corresponding to FIG. 3, which will not be repeated here.

The node determining module 15 includes: a to-be-checked unit 151, a quantity-of-times obtaining unit 152, and an abnormality determining unit 153.

The to-be-checked unit 151 is configured to determine the consensus node corresponding to the target quantity of abnormal verifications greater than an abnormal quantity-of-times threshold as a to-be-checked consensus node according to the at least two consensus nodes according to the target quantity of abnormal verifications of each consensus node counted by the target consensus node.

The quantity-of-times obtaining unit 152 is configured to obtain a target quantity of abnormal verifications of the to-be-checked consensus node counted by each consensus node.

The abnormality determining unit 153 is configured to determine the to-be-checked consensus node as the abnormal consensus node when the target quantity of abnormal verifications of the to-be-checked consensus node counted by each consensus node satisfies a criterion for determining the abnormal consensus node.

For implementations of functions of the to-be-checked unit 151, the quantity-of-times obtaining unit 152, and the abnormality determining unit 153, reference may be made to step S105 in the embodiment corresponding to FIG. 3, which will not be repeated here.

The abnormality determining unit 153 includes: a node quantity obtaining subunit 1531 and an abnormality determining subunit 1532.

The node quantity obtaining subunit 1531 is configured to obtain a node quantity of the consensus nodes corresponding to the target quantity of abnormal verifications greater than the abnormal quantity-of-times threshold according to the target quantity of abnormal verifications of the to-be-checked consensus node counted by each consensus node.

The abnormality determining subunit 1532 is configured to determine that the target quantity of abnormal verifications of the to-be-checked consensus node counted by each consensus node satisfies the criterion for determining the abnormal consensus node, when a ratio of the node quantity to a total node quantity of the at least two consensus nodes is greater than a ratio threshold.

For implementations of functions of the node quantity obtaining subunit 1531 and the abnormality determining subunit 1532, reference may be made to step S105 in the embodiment corresponding to FIG. 3, which will not be repeated here.

The data detection apparatus 1 is further configured to:

determine that the target quantity of abnormal verifications of the to-be-checked consensus node counted by each consensus node does not satisfy the criterion for determining the abnormal consensus node and determining the to-be-checked consensus node as a normal consensus node, when the ratio of the node quantity to the total node quantity of the at least two consensus is less than or equal to the ratio threshold.

The data detection apparatus 1 is further configured to:

broadcast the abnormal consensus node to each consensus node, so that each consensus node adds the abnormal consensus node to a node blacklist, the node blacklist being configured for rejecting a block transaction initiated by the abnormal consensus node.

By the embodiments of this application, an abnormal consensus node can be detected from at least two consensus nodes. By actively discovering an abnormal consensus node in a blockchain network and performing corresponding processing on the abnormal consensus node (for example, adding the abnormal consensus to a blacklist), the network security of the blockchain network is improved.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 8:
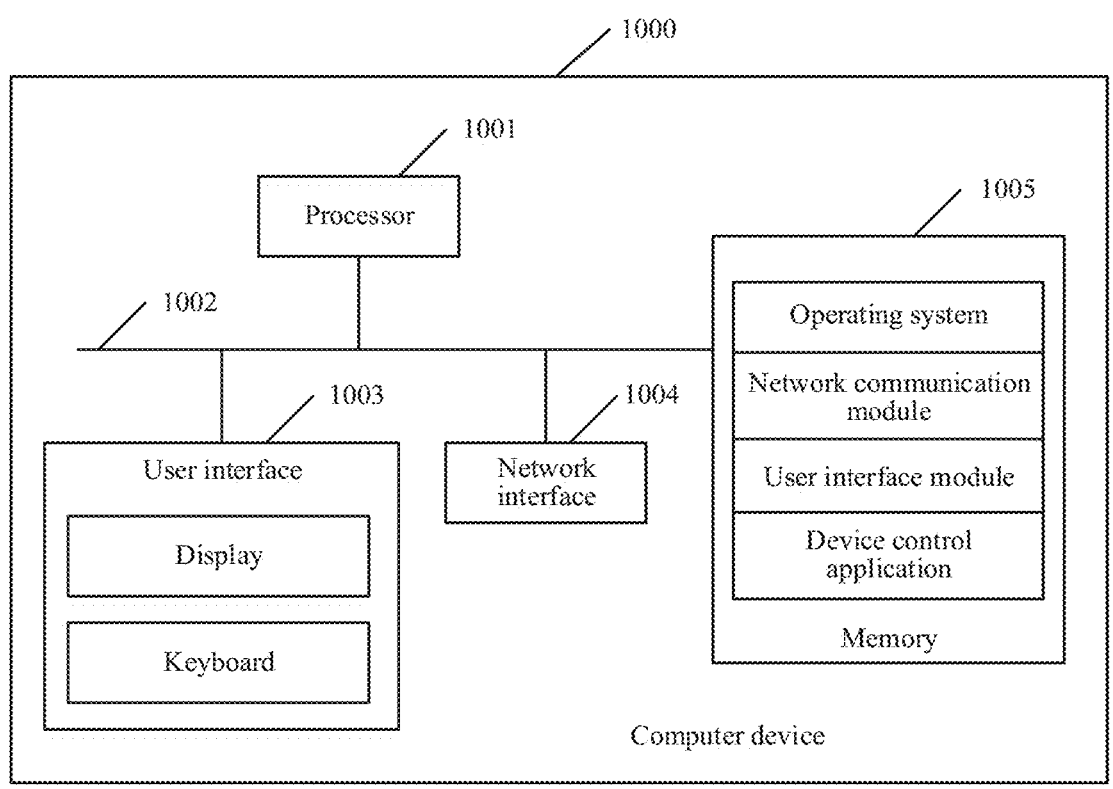
FIG. 8 is a schematic structural diagram of a computer device according to an embodiment of this application.

Refer to FIG. 8, which is a schematic structural diagram of a computer device according to an embodiment of this application. The computer device may be used as a target consensus node in the embodiments of this application. As shown in FIG. 8, the computer device 1000 may include: a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. Optionally, the user interface 1003 may further include a standard wired interface and a standard wireless interface. The network interface 1004 may include a standard wired interface and a standard wireless interface (for example, a Wi-Fi interface). The memory 1005 may be a high-speed RAM, or may be a non-volatile memory, for example, at least one magnetic disk memory. The memory 1005 may alternatively be at least one storage apparatus located remotely from the processor 1001. As shown in FIG. 8, the memory 1005 used as a computer storage medium may include an operating system, a network communication module, a user interface module, and a device control application.

In the computer device 1000 shown in FIG. 8, the network interface 1004 may provide a network communication function, the user interface 1003 is mainly configured to provide an input interface for a user, and the processor 1001 may be configured to invoke the device control application stored in the memory 1005, to implement the descriptions of the blockchain-based data detection method in the embodiment corresponding to FIG. 3. It is to be understood that the computer device 1000 described in this application may also implement the description of the data detection apparatus 1 in the foregoing embodiment corresponding to FIG. 7, which will not be repeated here. In addition, beneficial effects achieved by using the same method are not described herein again.

In addition, this application further provides a non-transitory computer-readable storage medium. The computer-readable storage medium stores a computer program executed by the data detection apparatus 1 mentioned above, and the computer program includes program instructions. When executing the program instructions, the processor can implement the descriptions of the data detection method in the embodiment corresponding to FIG. 3, which will not be repeated here. In addition, beneficial effects achieved by using the same method are not described herein again. For technical details that are not disclosed in the embodiment of the computer storage medium of this application, refer to the descriptions of the method embodiments of this application.

A person of ordinary skill in the art may understand that all or some of the processes of the methods in the embodiments may be implemented by a computer program instructing relevant hardware. The program may be stored in a non-transitory computer-readable storage medium. When the program is executed, the procedures of the foregoing method embodiments are performed. The foregoing storage medium may include a magnetic disc, an optical disc, a read-only memory (ROM), a random access memory (RAM), or the like.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A blockchain-based data detection method performed by a computer device acting as a target consensus node of a blockchain-based computer network, the method comprising:

obtaining respective block verification results of at least two consensus nodes of the blockchain-based computer network for a to-be-verified block;

counting a first quantity of valid verification results and a second quantity of invalid verification results among the respective block verification results of the at least two consensus nodes for the block;

determining a target verification result for the block according to the first quantity and the second quantity, the target verification result being a valid verification result or an invalid verification result;

comparing the target verification result with the respective block verification results of the at least two consensus nodes for the block, and updating a historical quantity of abnormal verifications corresponding to each consensus node according to a result of the comparison, to obtain a target quantity of abnormal verifications of each consensus node counted by the target consensus node;

determining an abnormal consensus node among the at least two consensus nodes according to the target quantity of abnormal verifications of each consensus node counted by the target consensus node, further including;

determining a consensus node as a to-be-checked consensus node when the target quantity of abnormal verifications of the to-be-checked consensus node counted by the target consensus node is greater than an abnormal quantity-of-times threshold;

sending a request to each consensus node of the blockchain-based computer network for reporting a corresponding target quantity of abnormal verifications of the to-be-checked consensus node counted by the consensus node;

obtaining a target quantity of abnormal verifications of the to-be-checked consensus node counted by each consensus node of the blockchain-based computer network, wherein the target quantities of abnormal verifications of the to-be-checked consensus node counted by difference consensus nodes of the blockchain-based computer network are not the same;

obtaining a node quantity of the consensus nodes of the blockchain-based computer network whose corresponding counted-target quantities of abnormal verifications of the to-be-checked consensus node are greater than the abnormal quantity-of-times threshold; and determining the to-be-checked consensus node as the abnormal consensus node when a ratio of the node quantity to a total node quantity of the blockchain-based computer network is greater than a ratio threshold; and broadcasting the abnormal consensus node to each consensus node of the blockchain-based computer network, wherein the remaining consensus nodes of the blockchain-based computer network remove the abnormal consensus node from the blockchain-based computer network.

2. The method according to claim 1, wherein the obtaining respective block verification results of at least two consensus nodes for the to-be-verified block comprises:

generating the block;

broadcasting the block to each consensus node, so that each consensus node performs block verification on the block; and obtaining the block verification result of each consensus node for the block.

3. The method according to claim 1, wherein the determining the target verification result for the block according to the first quantity and the second quantity comprises:

determining the valid verification result as the target verification result when the first quantity is greater than the second quantity; and determining the invalid verification result as the target verification result when the first quantity is less than the second quantity.

4. The method according to claim 1, wherein the counting the first quantity of valid verification results and the second quantity of invalid verification results among the respective block verification results of the at least two consensus nodes for the block comprise:

obtaining a block verification vote quantity corresponding to each consensus node;

determining the consensus node of which the block verification result is the valid verification result as a first consensus node according to the respective block verification results of the at least two consensus nodes for the block;

determining the consensus node of which the block verification result is the invalid verification result as a second consensus node according to the respective block verification results of the at least two consensus nodes for the block; and determining a sum of the block verification vote quantities corresponding to the first consensus nodes as the first quantity, and determining a sum of the block verification vote quantities corresponding to the second consensus nodes the second quantity.

5. The method according to claim 1, wherein the target consensus node is determined by voting by the at least two consensus nodes based on a voting mechanism; and the method further comprises:

obtaining a block height of the block, and obtaining a height difference between the block height and a verification start height, the verification start height being a maximum block height of a block held by the target consensus node when the target consensus node is determined by voting based on the voting mechanism; and transmitting a voting request to each consensus node when the height difference is greater than a height difference threshold, so that each consensus node revotes on the target consensus node according to the voting request and the voting mechanism.

6. The method according to claim 1, wherein the updating the historical quantity of abnormal verifications corresponding to each consensus node according to the result of the comparison, to obtain the target quantity of abnormal verifications of each consensus node counted by the target consensus node comprises:

determining the consensus node corresponding to the block verification result different from the target verification result as a conflicting consensus node according to the respective block verification results of the at least two consensus nodes for the block;

determining, among the at least two consensus nodes, consensus nodes other than the conflicting consensus nodes as matching consensus nodes; and increasing the historical quantities of abnormal verifications corresponding to the conflicting consensus nodes by a unit abnormal quantity to obtain target quantities of abnormal verifications corresponding to the conflicting consensus nodes, and determining the historical quantities of abnormal verifications corresponding to the matching consensus nodes as target quantities of abnormal verifications corresponding to the matching consensus node, wherein, when the block does not have a predecessor block, the historical quantity of abnormal verifications corresponding to each consensus node is a default initial quantity; and when the block has a predecessor block, the historical quantity of abnormal verifications corresponding to each consensus node is a quantity of abnormal verifications of each consensus node that is obtained based on block verification results of the at least two consensus nodes for the predecessor block.

7. The method according to claim 1, wherein the method further comprises:

determining that the target quantity of abnormal verifications of the to-be-checked consensus node counted by each consensus node does not satisfy the criterion for determining the abnormal consensus node and determining the to-be-checked consensus node as a normal consensus node, when the ratio of the node quantity to the total node quantity of the at least two consensus is less than or equal to the ratio threshold.

8. A computer device, comprising a memory and a processor, the memory storing a computer program, the computer program, when executed by the processor, causing the computer device to perform a blockchain-based data detection method including:

obtaining respective block verification results of at least two consensus nodes of the blockchain-based computer network for a to-be-verified block;

counting a first quantity of valid verification results and a second quantity of invalid verification results among the respective block verification results of the at least two consensus nodes for the block;

determining a target verification result for the block according to the first quantity and the second quantity, the target verification result being a valid verification result or an invalid verification result;

comparing the target verification result with the respective block verification results of the at least two consensus nodes for the block, and updating a historical quantity of abnormal verifications corresponding to each consensus node according to a result of the comparison, to obtain a target quantity of abnormal verifications of each consensus node counted by the target consensus node;

determining an abnormal consensus node among the at least two consensus nodes according to the target quantity of abnormal verifications of each consensus node counted by the target consensus node, further including:

determining a consensus node as a to-be-checked consensus node when the target quantity of abnormal verifications of the to-be-checked consensus node counted by the target consensus node is greater than an abnormal quantity-of-times threshold;

sending a request to each consensus node of the blockchain-based computer network for reporting a corresponding target quantity of abnormal verifications of the to-be-checked consensus node counted by the consensus node;

obtaining a target quantity of abnormal verifications of the to-be-checked consensus node counted by each consensus node of the blockchain-based computer network, wherein the target quantities of abnormal verifications of the to-be-checked consensus node counted by difference consensus nodes of the blockchain-based computer network are not the same;

obtaining a node quantity of the consensus nodes of the blockchain-based computer network whose corresponding counted-target quantities of abnormal verifications of the to-be-checked consensus node are greater than the abnormal quantity-of-times threshold; and determining the to-be-checked consensus node as the abnormal consensus node when a ratio of the node quantity to a total node quantity of the blockchain-based computer network is greater than a ratio threshold; and broadcasting the abnormal consensus node to each consensus node of the blockchain-based computer network, wherein the remaining consensus nodes of the blockchain-based computer network remove the abnormal consensus node from the blockchain-based computer network.

9. The computer device according to claim 8, wherein the obtaining respective block verification results of at least two consensus nodes for the to-be-verified block comprises:

generating the block;

broadcasting the block to each consensus node, so that each consensus node performs block verification on the block; and obtaining the block verification result of each consensus node for the block.

10. The computer device according to claim 8, wherein the determining the target verification result for the block according to the first quantity and the second quantity comprises:

determining the valid verification result as the target verification result when the first quantity is greater than the second quantity; and determining the invalid verification result as the target verification result when the first quantity is less than the second quantity.

11. The computer device according to claim 8, wherein the counting the first quantity of valid verification results and the second quantity of invalid verification results among the respective block verification results of the at least two consensus nodes for the block comprise:
obtaining a block verification vote quantity corresponding to each consensus node;
determining the consensus node of which the block verification result is the valid verification result as a first consensus node according to the respective block verification results of the at least two consensus nodes for the block;
determining the consensus node of which the block verification result is the invalid verification result as a second consensus node according to the respective block verification results of the at least two consensus nodes for the block; and
determining a sum of the block verification vote quantities corresponding to the first consensus nodes as the first quantity, and determining a sum of the block verification vote quantities corresponding to the second consensus nodes the second quantity.

12. The computer device according to claim 8, wherein the target consensus node is determined by voting by the at least two consensus nodes based on a voting mechanism; and the method further comprises:
obtaining a block height of the block, and obtaining a height difference between the block height and a verification start height,
the verification start height being a maximum block height of a block held by the target consensus node when the target consensus node is determined by voting based on the voting mechanism; and
transmitting a voting request to each consensus node when the height difference is greater than a height difference threshold, so that each consensus node revotes on the target consensus node according to the voting request and the voting mechanism.

13. The computer device according to claim 8, wherein the updating the historical quantity of abnormal verifications corresponding to each consensus node according to the result of the comparison, to obtain the target quantity of abnormal verifications of each consensus node counted by the target consensus node comprises:
determining the consensus node corresponding to the block verification result different from the target verification result as a conflicting consensus node according to the respective block verification results of the at least two consensus nodes for the block;
determining, among the at least two consensus nodes, consensus nodes other than the conflicting consensus nodes as matching consensus nodes; and
increasing the historical quantities of abnormal verifications corresponding to the conflicting consensus nodes by a unit abnormal quantity to obtain target quantities of abnormal verifications corresponding to the conflicting consensus nodes, and determining the historical quantities of abnormal verifications corresponding to the matching consensus nodes as target quantities of abnormal verifications corresponding to the matching consensus node,
wherein, when the block does not have a predecessor block, the historical quantity of abnormal verifications corresponding to each consensus node is a default initial quantity; and when the block has a predecessor block, the historical quantity of abnormal verifications corresponding to each consensus node is a quantity of abnormal verifications of each consensus node that is obtained based on block verification results of the at least two consensus nodes for the predecessor block.

14. A non-transitory computer-readable storage medium, storing a computer program, the computer program comprising program instructions, the program instructions, when executed by a processor of a computer device, causing the computer device to perform a blockchain-based data detection method including:
obtaining respective block verification results of at least two consensus nodes of the blockchain-based computer network for a to-be-verified block;
counting a first quantity of valid verification results and a second quantity of invalid verification results among the respective block verification results of the at least two consensus nodes for the block;
determining a target verification result for the block according to the first quantity and the second quantity, the target verification result being a valid verification result or an invalid verification result;
comparing the target verification result with the respective block verification results of the at least two consensus nodes for the block, and updating a historical quantity of abnormal verifications corresponding to each consensus node according to a result of the comparison, to obtain a target quantity of abnormal verifications of each consensus node counted by the target consensus node;
determining an abnormal consensus node among the at least two consensus nodes according to the target quantity of abnormal verifications of each consensus node counted by the target consensus node, further including:
determining a consensus node as a to-be-checked consensus node when the target quantity of abnormal verifications of the to-be-checked consensus node counted by the target consensus node is greater than an abnormal quantity-of-times threshold;
sending a request to each consensus node of the blockchain-based computer network for reporting a corresponding target quantity of abnormal verifications of the to-be-checked consensus node counted by the consensus node;
obtaining a target quantity of abnormal verifications of the to-be-checked consensus node counted by each consensus node of the blockchain-based computer network, wherein the target quantities of abnormal verifications of the to-be-checked consensus node counted by difference consensus nodes of the blockchain-based computer network are not the same;
obtaining a node quantity of the consensus nodes of the blockchain-based computer network whose corresponding counted-target quantities of abnormal verifications of the to-be-checked consensus node are greater than the abnormal quantity-of-times threshold; and
determining the to-be-checked consensus node as the abnormal consensus node when a ratio of the node quantity to a total node quantity of the blockchain-based computer network is greater than a ratio threshold; and
broadcasting the abnormal consensus node to each consensus node of the blockchain-based computer network, wherein the remaining consensus nodes of the blockchain-based computer network remove the abnormal consensus node from the blockchain-based computer network.

15. The non-transitory computer-readable storage medium according to claim 14, wherein the determining the target verification result for the block according to the first quantity and the second quantity comprises:
    determining the valid verification result as the target verification result when the first quantity is greater than the second quantity; and
    determining the invalid verification result as the target verification result when the first quantity is less than the second quantity.

16. The non-transitory computer-readable storage medium according to claim 14, wherein the obtaining respective block verification results of at least two consensus nodes for the to-be-verified block comprises:
    generating the block;
    broadcasting the block to each consensus node, so that each consensus node performs block verification on the block; and
    obtaining the block verification result of each consensus node for the block.

17. The non-transitory computer-readable storage medium according to claim 14, wherein the counting the first quantity of valid verification results and the second quantity of invalid verification results among the respective block verification results of the at least two consensus nodes for the block comprise:
    obtaining a block verification vote quantity corresponding to each consensus node;
    determining the consensus node of which the block verification result is the valid verification result as a first consensus node according to the respective block verification results of the at least two consensus nodes for the block;
    determining the consensus node of which the block verification result is the invalid verification result as a second consensus node according to the respective block verification results of the at least two consensus nodes for the block; and
    determining a sum of the block verification vote quantities corresponding to the first consensus nodes as the first quantity, and determining a sum of the block verification vote quantities corresponding to the second consensus nodes the second quantity.

18. The non-transitory computer-readable storage medium according to claim 14, wherein the target consensus node is determined by voting by the at least two consensus nodes based on a voting mechanism; and the method further comprises:
    obtaining a block height of the block, and obtaining a height difference between the block height and a verification start height,
    the verification start height being a maximum block height of a block held by the target consensus node when the target consensus node is determined by voting based on the voting mechanism; and
    transmitting a voting request to each consensus node when the height difference is greater than a height difference threshold, so that each consensus node revotes on the target consensus node according to the voting request and the voting mechanism.

19. The non-transitory computer-readable storage medium according to claim 14, wherein the updating the historical quantity of abnormal verifications corresponding to each consensus node according to the result of the comparison, to obtain the target quantity of abnormal verifications of each consensus node counted by the target consensus node comprises:
    determining the consensus node corresponding to the block verification result different from the target verification result as a conflicting consensus node according to the respective block verification results of the at least two consensus nodes for the block;
    determining, among the at least two consensus nodes, consensus nodes other than the conflicting consensus nodes as matching consensus nodes; and
    increasing the historical quantities of abnormal verifications corresponding to the conflicting consensus nodes by a unit abnormal quantity to obtain target quantities of abnormal verifications corresponding to the conflicting consensus nodes, and determining the historical quantities of abnormal verifications corresponding to the matching consensus nodes as target quantities of abnormal verifications corresponding to the matching consensus node,
    wherein, when the block does not have a predecessor block, the historical quantity of abnormal verifications corresponding to each consensus node is a default initial quantity; and when the block has a predecessor block, the historical quantity of abnormal verifications corresponding to each consensus node is a quantity of abnormal verifications of each consensus node that is obtained based on block verification results of the at least two consensus nodes for the predecessor block.

* * * * *